(12) United States Patent
Tanaka et al.

(10) Patent No.: US 10,399,598 B2
(45) Date of Patent: Sep. 3, 2019

(54) MOVING VEHICLE

(71) Applicant: Sharp Kabushiki Kaisha, Sakai, Osaka (JP)

(72) Inventors: Kosuke Tanaka, Sakai (JP); Kyosuke Taka, Sakai (JP); Yoshitaka Okahashi, Sakai (JP); Atsushi Higuchi, Sakai (JP); Kiyotaka Hirata, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 170 days.

(21) Appl. No.: 15/697,128

(22) Filed: Sep. 6, 2017

(65) Prior Publication Data
US 2018/0065242 A1 Mar. 8, 2018

(30) Foreign Application Priority Data

Sep. 6, 2016 (JP) ................................. 2016-173815
May 23, 2017 (JP) ................................. 2017-101932

(51) Int. Cl.
| | |
|---|---|
| *B62D 11/04* | (2006.01) |
| *B25J 5/00* | (2006.01) |
| *B60K 7/00* | (2006.01) |
| *G05D 1/02* | (2006.01) |
| *B25J 9/16* | (2006.01) |
| *B60K 17/04* | (2006.01) |

(Continued)

(52) U.S. Cl.
CPC ............... *B62D 11/04* (2013.01); *B25J 5/007* (2013.01); *B60K 7/0007* (2013.01); *G05D 1/021* (2013.01); *B25J 9/1697* (2013.01); *B60K 1/04* (2013.01); *B60K 17/043* (2013.01); *B60K 17/342* (2013.01); *B60K 17/36* (2013.01); *B60K 2007/0046* (2013.01); *B60K 2007/0092* (2013.01); *F16F 7/14* (2013.01)

(58) Field of Classification Search
CPC .............................. B60B 19/003; B62D 11/04
See application file for complete search history.

(56) References Cited

U.S. PATENT DOCUMENTS 5,323,867 A * 6/1994 Griffin ..................... B25J 5/007
                                                          180/22
7,552,784 B2 * 6/2009 Torita .................... B60B 19/003
                                                       180/24.07

(Continued)

FOREIGN PATENT DOCUMENTS

| JP | 2005-111595 A | 4/2005 |
|---|---|---|
| JP | 2017061204 A * | 3/2017 |

*Primary Examiner* — Kevin Hurley
(74) *Attorney, Agent, or Firm* — ScienBiziP, P.C.

(57) ABSTRACT

A moving vehicle includes a skid-steer electric motor vehicle chassis that is capable of traveling and an optical sensor provided on the electric motor vehicle chassis. The electric motor vehicle chassis includes a chassis body, a plurality of wheels that are provided as pairs of right and left wheels at the front and rear of the chassis body, and a driving unit that individually rotation-drives the pairs of right and left wheels. The optical sensor is disposed, in planar view, at a position nearby an axle line of a pair of right and left wheels on one side of the front and rear. A pair of right and left wheels on the other side of the front and rear is configured of wheels with rollers each having a wheel body and a plurality of rollers provided on an outer circumferential portion of the wheel body.

16 Claims, 11 Drawing Sheets

(51) Int. Cl.
*B60K 17/36* (2006.01)
*F16F 7/14* (2006.01)
*B60K 1/04* (2019.01)
*B60K 17/342* (2006.01)

(56) References Cited

U.S. PATENT DOCUMENTS 9,995,827 B2 * 6/2018 Matsuyama ............ G01S 17/42
2017/0327000 A1 * 11/2017 Wada ....................... B60K 1/02

* cited by examiner

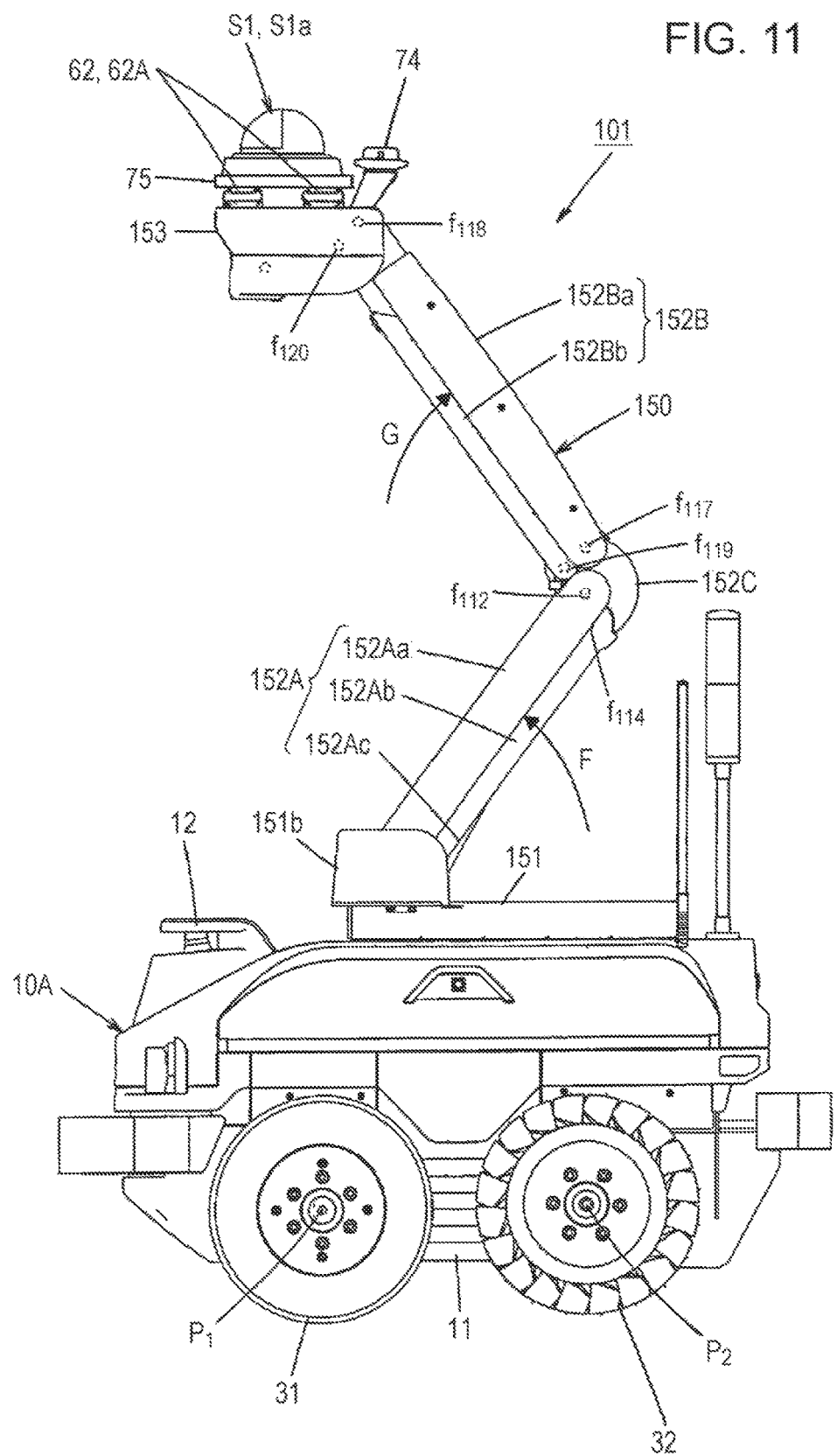

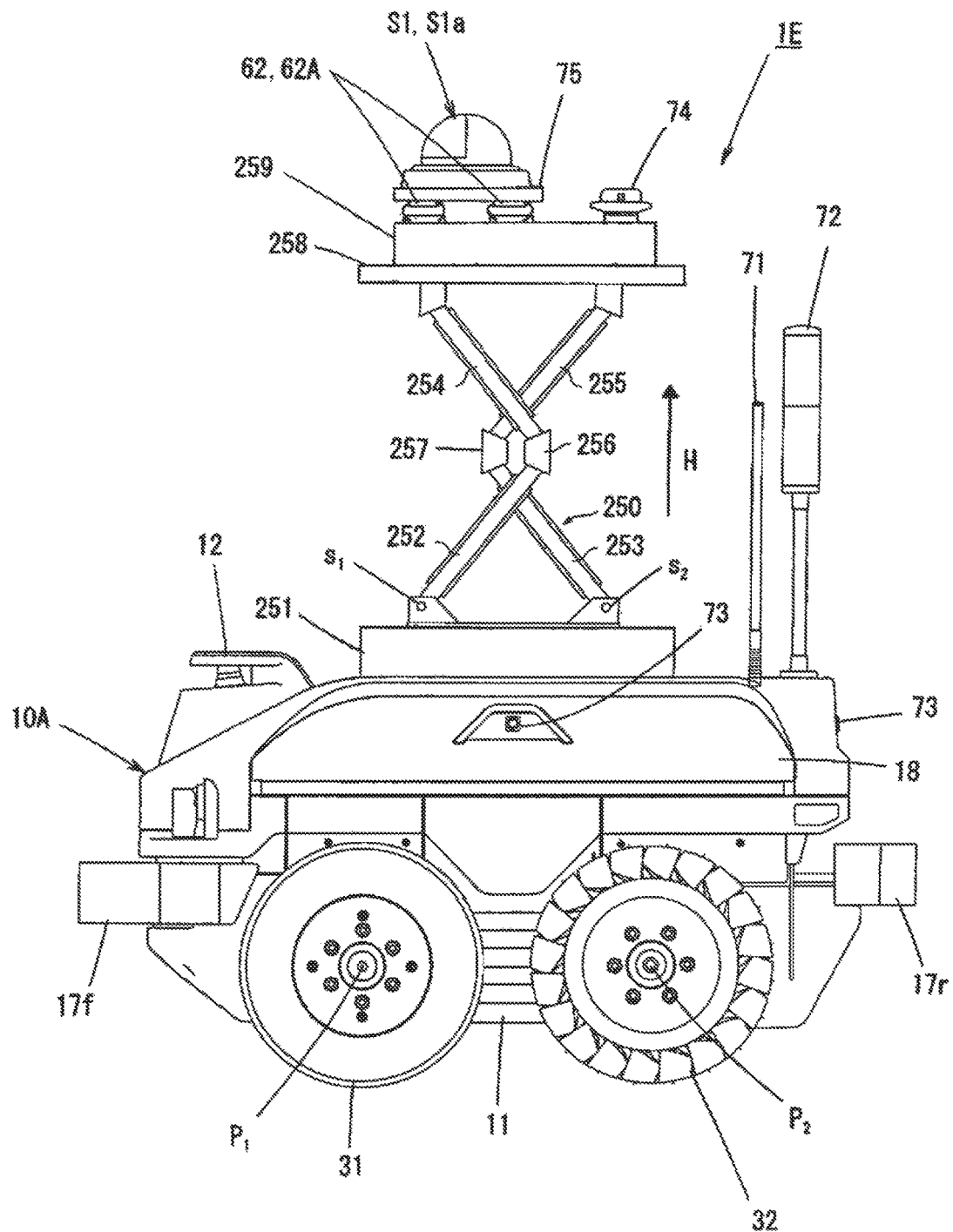

MOVING VEHICLE

BACKGROUND

1. Field

The present disclosure relates to a moving vehicle, and specifically, to a moving vehicle including an optical sensor that images a monitoring target object.

2. Description of the Related Art

In recent days, autonomously traveling vehicles that move autonomously, such as a robot for transportation which transports luggage and a robot for monitoring which monitors situations inside a building, near the building, and inside a predetermined site, are used. In addition, in some cases, autonomously traveling vehicles, on which cameras, various types of sensors, arms, and booms are mounted, are used for operations carried out in hazardous regions, such as searching for victims in areas hit by disasters, including earthquakes, tsunamis, and landslides, and collecting information on the insides of factories and plants where an accident took place (for example, refer to Japanese Unexamined Patent Application Publication No. 2005-111595).

Such an autonomously traveling vehicle of the related art stores information of a map of a region to be traveled and movement route information in advance, and travels a predetermined route while avoiding obstacles with the use of information acquired from a camera, a distance image sensor, and Global Positioning System (GPS).

In an autonomously traveling vehicle on which a camera is mounted, the camera is disposed, in general, on a front portion of a car body in order to improve visibility in a moving direction.

However, in the case of a skid-steer crawler-type vehicle disclosed in Japanese Unexamined Patent Application Publication No. 2005-111595, the rotation radius of the camera during stationary rotation becomes larger and the shaking of the camera becomes larger due to the effect of centrifugal force since a stationary rotation center matches a vehicle center. As a result, there is a problem in which an image blur becomes greater.

SUMMARY

It is desirable for the disclosure to deal with such a problem and to provide a moving vehicle that can suppress an image blur with a simple configuration.

According to an aspect of the disclosure, there is provided a moving vehicle including a skid-steer electric motor vehicle chassis that is capable of traveling and an optical sensor provided on the electric motor vehicle chassis. The electric motor vehicle chassis includes a chassis body, a plurality of wheels that are provided as pairs of right and left wheels at the front and rear of the chassis body, and a driving unit that individually rotation-drives the pairs of right and left wheels. The optical sensor is disposed, in planar view, at a position nearby an axle line of a pair of right and left wheels on one side of the front and rear. A pair of right and left wheels on the other side of the front and rear is configured of wheels with rollers each having a wheel body and a plurality of rollers provided on an outer circumferential portion of the wheel body.

Herein, in the disclosure, a skid-steer system means a system of making the rotation speeds of the right and left wheels different from each other, a system of making the rotation directions of the right and left wheels opposite to each other, or a system, of rotating a vehicle by performing the both of the above systems.

BRIEF DESCRIPTION OF THE DRAWINGS

FIG. 1A is a left side view, and FIG. 1B is a sectional view taken along line IB-IB of FIG. 1A;

FIG. 6A illustrates the moving vehicle climbing a step on a road surface, FIG. 6B illustrates the moving vehicle climbing a projected portion on the road surface, and FIG. 6C illustrates the moving vehicle traveling a textured road surface;

FIG. 7A is a left side view, and FIG. 7B is a sectional view taken along line VIIB-VIIB of FIG. 7A;

FIG. 11 is a left side view illustrating an imaging unit raised state in the moving vehicle of FIG. 10; and FIG. 12 is a left side view illustrating Modification example 2 of a moving vehicle of Embodiment 3.

DESCRIPTION OF THE EMBODIMENTS

Figure 1A:
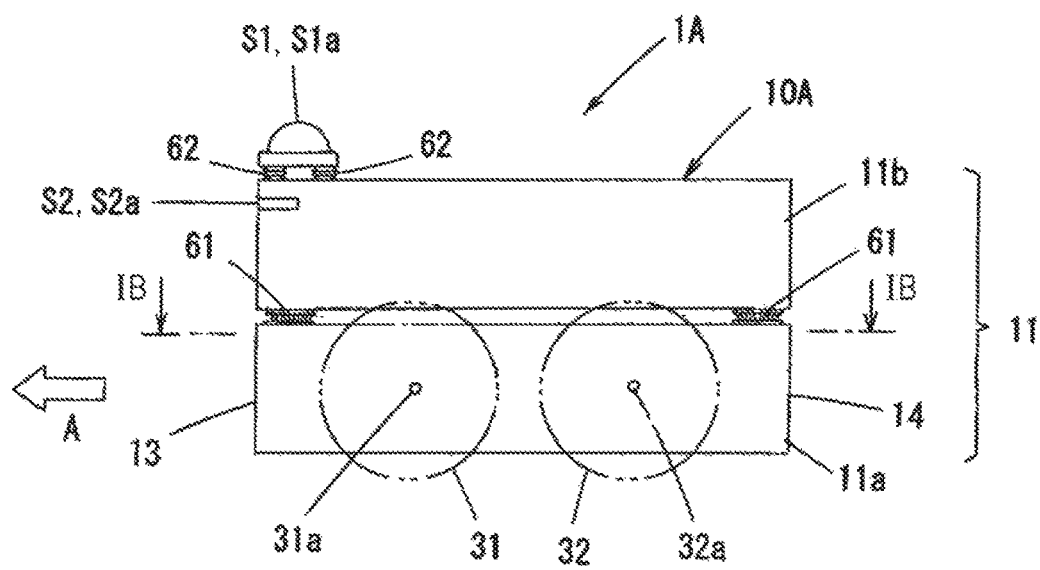
FIGS. 1A and 1B are views illustrating a schematic configuration of an electric motor vehicle chassis in Embodiment 1 of a moving vehicle of the disclosure.

A moving vehicle of the disclosure includes a skid-steer electric motor vehicle chassis that is capable of traveling and an optical sensor provided on the electric motor vehicle chassis. The electric motor vehicle chassis includes a chassis body, a plurality of wheels that are provided as pairs of right and left wheels at the front and rear of the chassis body, and a driving unit that individually rotation-drives the pairs of right and left wheels. The optical sensor is disposed, in planar view, at a position nearby an axle line of a pair of right and left wheels on one side of the front and rear. A pair of right and left wheels on the other side of the front and rear is configured of wheels with rollers each having a wheel body and a plurality of rollers provided on an outer circumferential portion of the wheel body.

The moving vehicle of the disclosure may be configured as follows or the followings may be combined as appropriate.

(1) The pair of right and left wheels on the one side of the front and rear each may have a wheel body and a tire filled with air that is attached to an outer circumferential portion of the wheel body.

According to the configuration, rubber tires absorb vibration transmitted from the pair of right and left wheels on one side of the front and rear to the optical sensor and the shaking of the optical sensor can be suppressed. As a result, the accuracy of image information and distance information obtained by the optical sensor can be improved.

(2) Outer surfaces of the pair of right and left wheels on the one side of the front and rear and outer-surfaces of the pair of right and left wheels on the other side of the front and rear may be lined up on a same plane.

In a case where the pair of right and left wheels on one side of the front and rear have rubber tires for a four-wheeled car, since the width of a wheel with rollers is often smaller than the width of a rubber tire in general, intervals between the right and left wheels with rollers can be made wider by adopting the above configuration. As a result, the vibration of the chassis body during traveling can be suppressed and the shaking of the optical sensor can be suppressed.

(3) The driving unit may have two electric motors that individually rotation-drive the pair of right and left wheels on the one side of the front and rear and a battery that supplies electric power to the two electric motors.

According to the configuration, in a case where an axle line middle portion of the pair of right and left wheels on one side of the front and rear is set as a stationary rotation center, the vibration of the chassis body during stationary rotation can be suppressed and the shaking of the optical sensor can be suppressed since the two electric motors, which are heavy objects, can be disposed adjacent to the stationary rotation center.

(4) The chassis body may have a lower frame unit having the plurality of wheels and the driving unit, an upper frame unit that is provided above the lower frame unit, and a first vibration absorbing member that is provided between the lower frame unit and the upper frame unit and connects the lower frame unit and the upper frame unit together, and the optical sensor may be provided on the upper frame unit.

That is, a configuration where the lower frame unit, on which the driving unit is mounted, which is a factor causing vibration during traveling, and the upper-frame unit, on which the optical sensor is mounted, are individually configured, a clearance is provided between the lower frame unit and the upper frame unit, and the first vibration absorbing member is disposed between the upper and lower frame units may be adopted. By adopting such a configuration, the vibration of the driving unit per se and the vibration of the lower frame unit during traveling a road surface having a step and during rotation can be made unlikely to be transmitted to the upper frame unit, and as a result, the shaking of the optical sensor can be suppressed.

(5) A second vibration absorbing member that is disposed between the upper frame unit and the optical sensor and connects the upper frame unit and the optical sensor together may be further included.

According to the configuration, the shaking of the optical sensor can be suppressed further.

(6) The optical sensor may have a first optical sensor and a second optical sensor, the second optical sensor may be provided on the upper frame unit, an elevating mechanism that is provided on the upper frame unit and raises and lowers the first optical sensor, and a second vibration absorbing member that is disposed between the elevating mechanism and the first optical sensor and connects the elevating mechanism and the first optical sensor together may be further included.

According to the configuration, information on the surroundings can be obtained with high accuracy from a high place by raising the first optical sensor while suppressing the shaking of the optical sensor. In this case, for example, the first optical sensor can be configured as an imaging unit that images an area in front of the moving vehicle in a moving direction, and the second optical sensor can be configured as a distance detecting unit that detects a distance to a measurement point in front of the moving vehicle in the moving direction.

(7) The first vibration absorbing member may be a helical vibration isolator having a wire wound around in a spiral, and the second vibration absorbing member may be a small-sized rope vibration isolator having a wire wound around in an up-and-down direction, in a right-and-left direction, and in a front-and-rear direction.

According to the configuration, the first vibration absorbing member can mostly absorb vibration in the up-and-down direction and the second vibration absorbing member can uniformly absorb vibration in a three-dimensional direction (front-and-rear direction, right-and-left direction, and up-and-down direction).

(8) A left power transmission mechanism that is connected to front and rear wheels on the left and a right power transmission mechanism, that is connected to front and rear wheels on the right may be further included.

According to the configuration, a four-wheel drive vehicle, in which the front and rear wheels on the left are rotation-driven by the left power transmission mechanism and the front and rear wheels on the right are rotation-driven by the right power transmission mechanism, can be obtained. As a result, since the climbing force of the driven wheels with rollers, for example, in the case of climbing a step on a road surface, or when rotating on a bumpy road, is increased, the vibration of the chassis body cam be suppressed and the shaking of the first and second optical sensor can be suppressed.

(9) A distance between axles of front and rear wheels may be configured so as to be shorter than a car body width of the electric motor vehicle chassis in a right-and-left direction.

According to the configuration, since the length of the chassis body in the front-and-rear direction can be made short, the effect of centrifugal force of the vehicle body during rotation (in particular, during stationary rotation) is small and the shaking of the optical sensor can be suppressed. In addition, since an interval between the right and left wheels can be made wider than a wheel base, the overturning of the moving vehicle during traveling on a slope is suppressed.

(10) The optical sensor may be disposed, in planar view, between the axle line of the pair of right and left wheels on the one side of the front and rear and an end portion of the electric motor vehicle chassis on a side of the axle line in a front-and-rear direction.

According to the configuration, the shaking of the optical sensor during stationary rotation can be suppressed. In addition, the blocking of the field of view of the optical sensor (including a vehicle body) in horizontal and vertical directions can be minimized and a wide field of view of the optical sensor can be secured.

(11) The driving unit may further include two gear boxes provided between the pair of right and left wheels on the one side of the front and rear and the two electric motors, and the two electric motors may be disposed, in planar view, closer to a middle side in a right-and-left direction than the two gear boxes.

According to the configuration, the vibration of the chassis body during stationary rotation can be suppressed and the shaking of the optical sensor can be suppressed since the two electric motors, which are heavy objects, can be disposed adjacent to the stationary rotation center.

EMBODIMENT 1

Figure 1B:
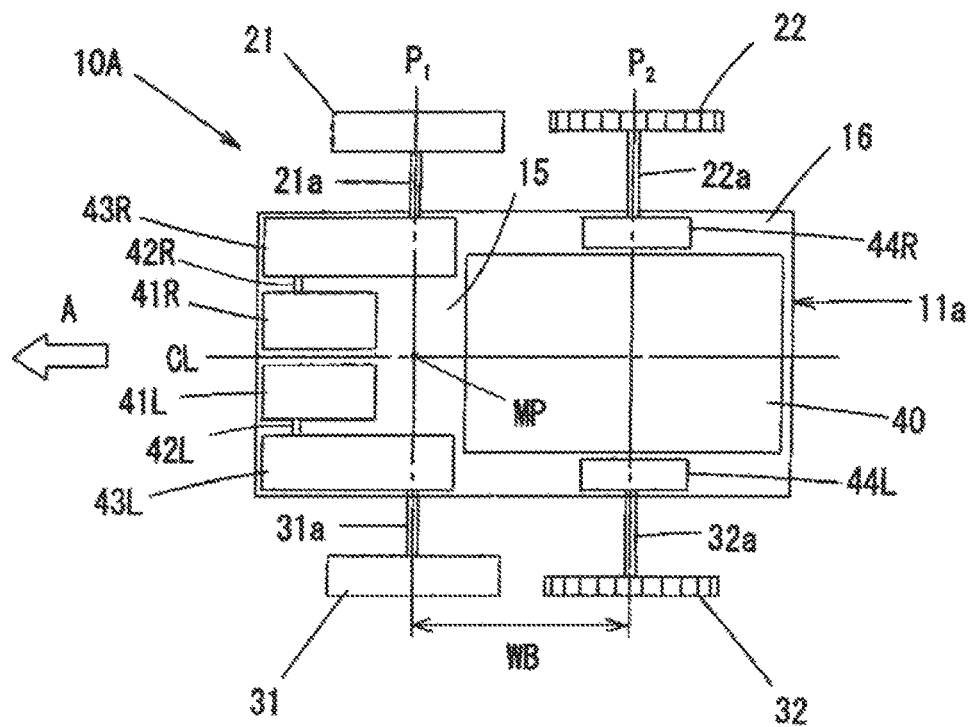
Figure 2:
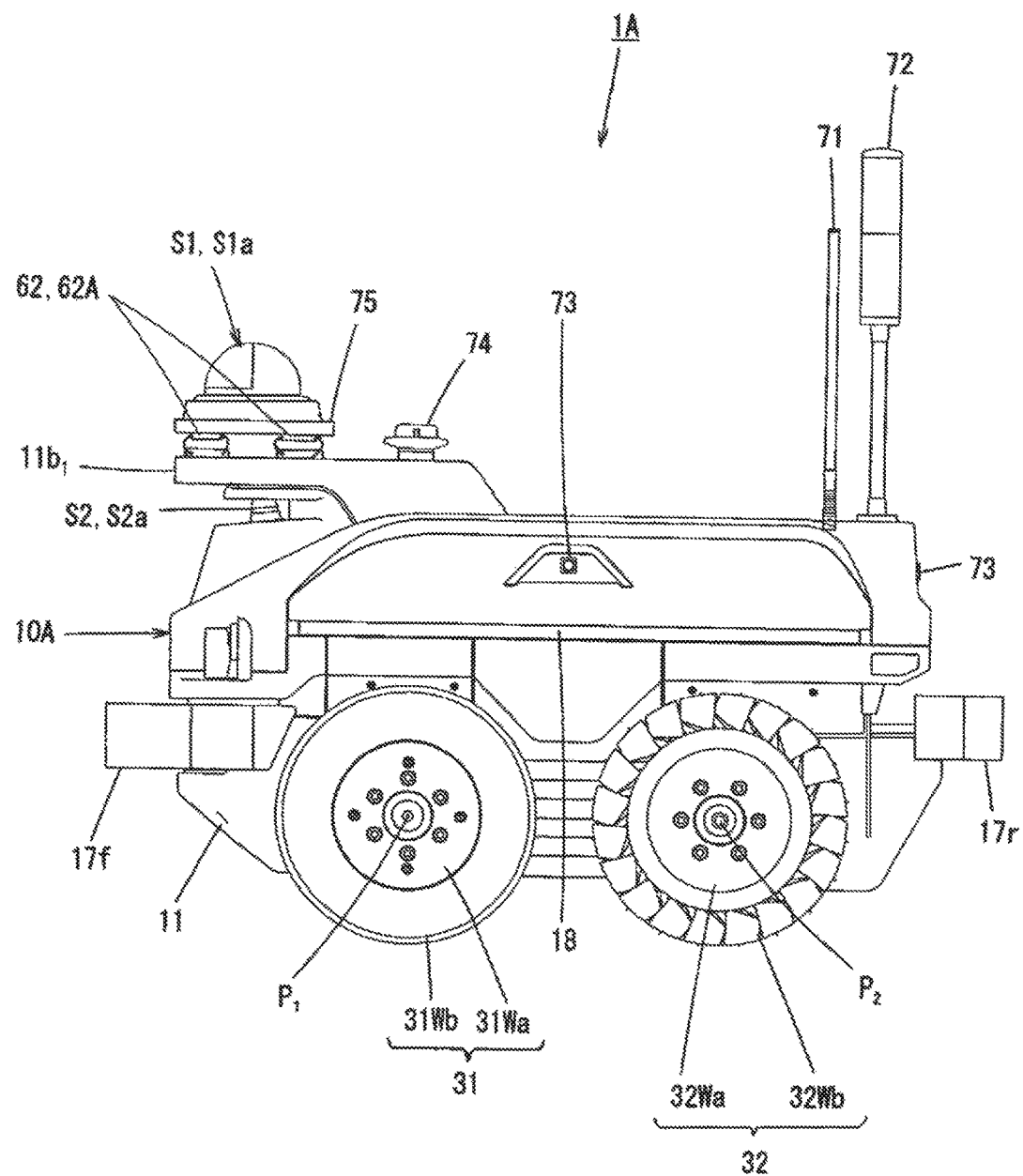
FIG. 2 is a left side view illustrating the moving vehicle of Embodiment 1.
Figure 3:
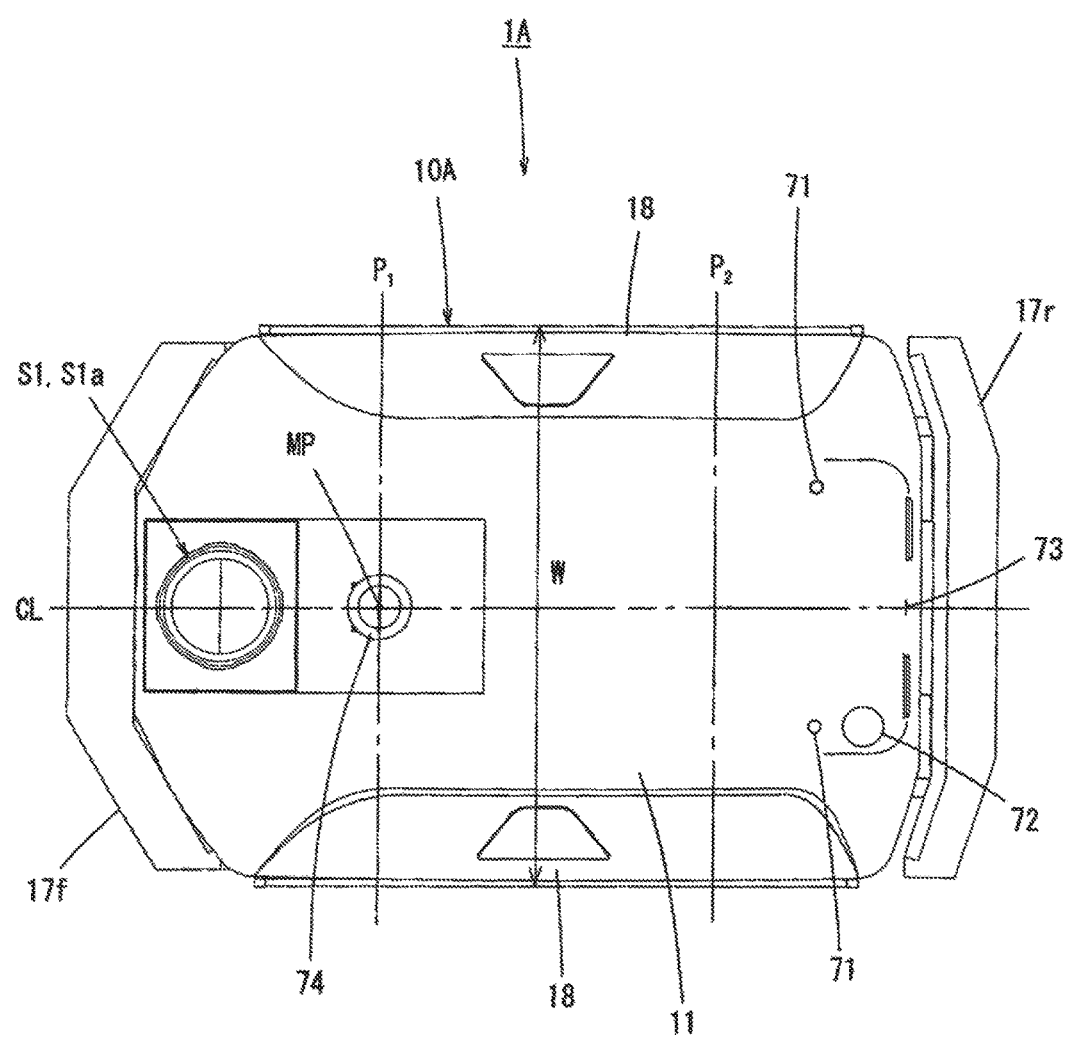
FIG. 3 is a plan view of the moving vehicle of FIG. 2 when viewed from above.
Figure 4:
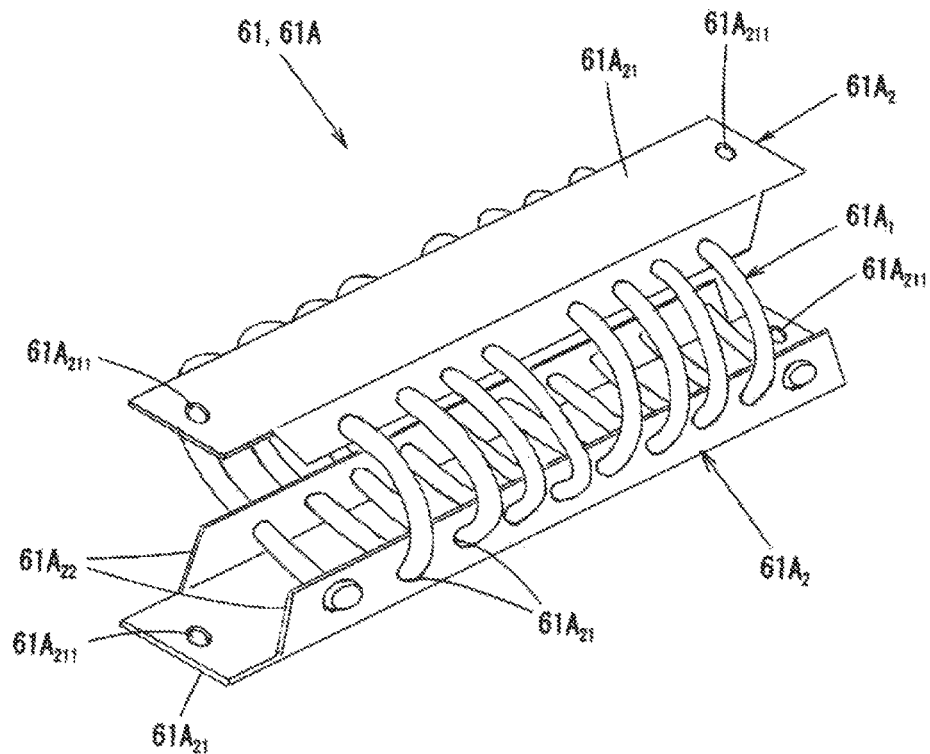
FIG. 4 is a perspective view illustrating a first vibration absorbing member in the moving vehicle of Embodiment 1.
Figure 5:
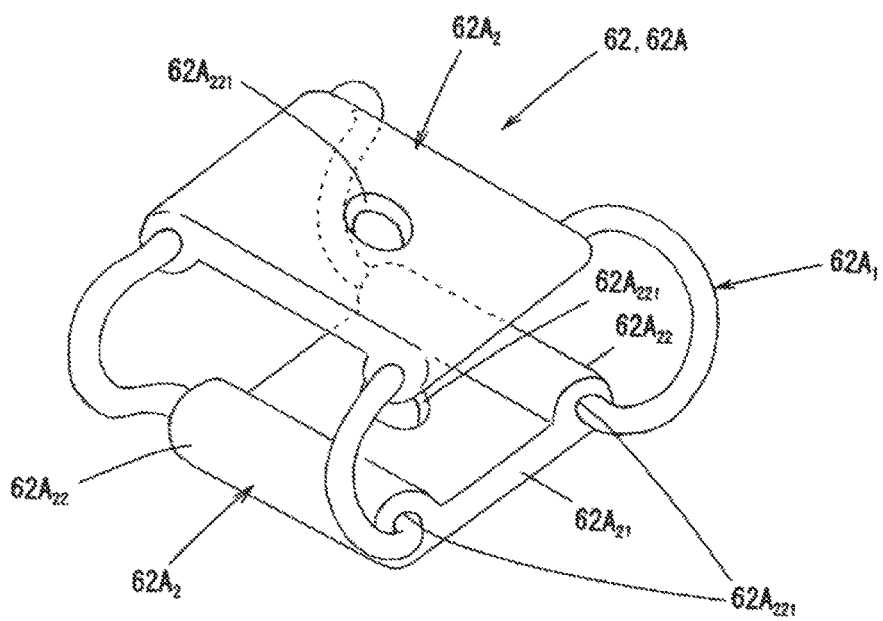
FIG. 5 is a perspective view illustrating a second vibration absorbing member in the moving vehicle of Embodiment 1.

FIGS. 1A and 1B are views illustrating a schematic configuration of an electric motor vehicle chassis in Embodiment 1 of a moving vehicle of the disclosure, FIG. 1A is a left side view, and FIG. 1B is a sectional view taken along line IB-IB of FIG. 1A. In addition, FIG. 2 is a left side view illustrating the moving vehicle of Embodiment 1, and FIG. 3 is a plan view of the moving vehicle of FIG. 2, which is viewed from above. In addition, FIG. 4 is a perspective view illustrating a first vibration absorbing member in the moving vehicle of Embodiment 1, and FIG. 5 is a perspective view illustrating a second vibration absorbing member in the moving vehicle of Embodiment 1.

A moving vehicle 1A of Embodiment 1 mostly includes a skid-steer electric motor vehicle chassis 10A that is capable of traveling, a first optical sensor S1 and a second optical sensor S2 that are provided on the electric motor vehicle chassis 10A, and a control unit (not illustrated) provided inside the electric motor vehicle chassis 10A. In addition, first vibration absorbing members 61 and second vibration absorbing members 62, both of which are for suppressing the shaking of the first and second optical sensors S1 and S2, are provided for the electric motor vehicle chassis 10A.

In Embodiment 1, the first optical sensor S1 is an imaging unit S1a that images an area in front of the moving vehicle 1A in a moving direction, and the second optical sensor S2 is a distance detecting unit S2a that detects a distance to a measurement point in front of the moving vehicle 1A in the moving direction.

In Embodiment 1, a case of an autonomous travel monitoring vehicle including the imaging unit S1a and the distance detecting unit S2a will be given as an example.

More specifically, a Wi-Fi antenna 71 and a warning lamp 72 are provided on a rear end portion of the electric motor vehicle chassis 10A, CCD cameras 73 are provided on right and left side surfaces and a rear end surface of the electric motor vehicle chassis 10A, and a GPS antenna 74 is provided at a position behind an optical sensor 60.

The imaging unit S1a is not particularly limited, and for example, security cameras, such as dome cameras (including a pan-tilt-zoom (PTZ) camera), box cameras, housing cameras, infrared night vision cameras, and telephoto cameras, can be used as the imaging unit. The imaging unit is provided on the electric motor vehicle chassis 10A such that a space in front of and on the right and left of the electric motor vehicle chassis 10A can be imaged. In a case where the moving vehicle 1A is used outdoors, a water proof function is added to the imaging unit S1a.

A type in which a lens has wide horizontal and vertical angles of view (for example, approximately horizontal 180° and approximately vertical 90°), a high-resolution type (for example, 3840×2160 pixels), a type which can image in color, a type which images only in a case where a person is detected, a type which detects a person and closes up and tracks the face, and an infrared night vision type which can image in the dark may be used as a dome camera.

The distance detecting unit S2a has a function of checking a region in front in a moving direction and a state of a road surface, a light-emitting unit that emits light, a light-receiving unit that receives light, and a scanning control unit that performs scanning in a direction of light emission such that light is emitted toward a plurality of predetermined measurement points in the space in front.

LIDAR, in which a laser is emitted to a two-dimensional space or a three-dimensional space within a predetermined distance measurement region and distances to a plurality of measurement points within the distance measurement region are measured, can be used as the distance detecting unit S2a.

The control unit (not illustrated) is a unit that executes a traveling function and a monitoring function of the moving vehicle 1A, and for example, is configured of a controller, a person detecting unit, an instruction recognizing unit, a communication unit, an instruction executing unit, and a memory unit.

The moving vehicle 1A is configured so as to store information of a map of a region to be traveled and movement route information in advance, and to travel a predetermined route while avoiding obstacles with the use of information acquired from the imaging unit S1a, the distance detecting unit S2a, and GPS (Global Positioning System).

At this time, in particular, with the use of the imaging unit S1a and the distance detecting unit S2a, the moving vehicle 1A recognizes the posture of an instructor, and freely travels while checking a state in front in a moving direction of the electric motor vehicle chassis 10A based on instructions correlated with the posture. For example, in a case where obstacles and steps are detected in front, a course is changed by performing operation such as stop, rotation, backward movement, and forward movement, and a function corresponding to an instruction is executed in order to avoid a crash into obstacles.

Next, a configuration related to the traveling of the moving vehicle 1A will be described with reference mostly to FIGS. 1A and 1B. In FIG. 1A, a front wheel 31 and a rear wheel 32 on the left are illustrated with two-dot chain lines.

Description on Electric Motor Vehicle Chassis

The electric motor vehicle chassis 10A includes a chassis body 11, a plurality of wheels provided as pairs of right and left wheels at the front and rear of the chassis body 11, and a driving unit that individually rotation-drives the pairs of right and left wheels. In Embodiment 1, a case of four wheels is given as an example.

The chassis body 11 has a lower frame unit 11a having the plurality of wheels and the driving unit, an upper frame unit 11b provided above the lower frame unit 11a, and the first vibration absorbing members 61 that are provided between the lower frame unit 11a and the upper frame unit 11b and connects the lower frame unit and the upper frame unit together. Details of the first vibration absorbing members 61 will be described later.

The driving unit includes two electric motors 41R and 41L that rotation-drive at least one pair of right and left wheels on the front and rear individually out of the four wheels, and a battery 40 that supplies electric power to the two electric motors 41R and 41L.

In the case of Embodiment 1, as illustrated in FIGS. 1A and 1B, the electric motor vehicle chassis 10A moves forward in an arrow A direction, front wheels 21 and 31 are right and left wheels on an arrow A side, the rest of right and left wheels are rear wheels 22 and 32, and the right and left front wheels 21 and 31 are individually driven and controlled by the two electric motors 41R and 41L.

Since FIGS. 1A and 1B are figures for simply describing each of units that configure the electric motor vehicle chassis and the disposition of the configuration units, the size and interval of each of the configuration units of the electric motor vehicle chassis illustrated in FIGS. 1A and 1B do not necessarily match those of the electric motor vehicle chassis illustrated in FIG. 2 and FIG. 3.

In the chassis body 11, bumpers 17f and 17r are attached to a front surface 13 and a rear surface 14 of the lower frame unit 11a.

In addition, a belt-like cover 18 is provided on a right surface of the upper frame unit 11b and a left surface of the upper frame unit 11b, and extends in a front-and-rear direction of the upper frame unit 11b.

In addition, axles 21a and 31a and axles 22a and 32a that rotation-support each of the front wheels 21 and 31 and the rear wheels 22 and 32 are provided below the cover 18, in the lower frame unit 11a.

The axles 21a and 31a of the front wheels 21 and 31, which are driving wheels, are disposed on the same first shaft center (axle line of the front wheels) $P_1$, and the axles 22a and 32a of the rear wheels 22 and 32, which are driven wheels, are disposed on the same second shaft center (axle line of the rear wheels) $P_2$.

Each of the axles 21a, 31a, 22a, and 32a is independently rotatable.

Two motors, which are the electric motor 41R for driving the right front wheel 21 and the electric motor 41L for driving the left front wheel 31, are provided on a bottom surface 15 of the lower frame unit 11a on a front wheel side. A gear box 43R is provided between a motor shaft 42R of the right electric motor 41R and the axle 21a of the right front wheel 21 as a power transmission mechanism. Similarly, a gear box 43L is provided between a motor shaft 42L of the left electric motor 41L and the axle 31a of the left front wheel 31 as a power transmission mechanism.

Herein, the two electric motors 41R and 41L are disposed in parallel so as to be bilaterally symmetric with respect to a center line CL in the moving direction of the chassis body 11 (arrow A direction), and each of the gear boxes 43R and 43L is also arranged on the outer sides of the electric motors 41R and 41L on the right and left. That is, the two electric motors 41R and 41L are disposed, in planar view, closer to a middle side in a right-and-left direction (close to the center line CL) than the two gear boxes 43R and 43L.

In addition, a wheel base WB, which is a distance between the axle line of the front wheels 21 and 31 (first shaft center $P_1$) and the axle line of the rear wheels 22 and 32 (second shaft center $P_2$), is configured so as to be shorter than a car body width W of the electric motor vehicle chassis 10A in the right-and-left direction. According to the configuration, since the length of the chassis body in the front-and-rear direction can be made short, the effect of centrifugal force of the chassis body 11 during rotation (in particular, during stationary rotation) is small and the shaking of the first and second optical sensors S1 and S2 can be suppressed.

The gear boxes 43R and 43L are configured of a plurality of gears and shafts, are assembled components that transmit power from the electric motors to the axles, which are output shafts, by changing the numbers of torque and rotation and rotation directions, and may include a clutch that switches transmission and block of power. The pair of rear wheels 22 and 32 is pivotally supported by bearings 44R and 44L respectively, and the bearings 44R and 44L are arranged so as to be closer to a right surface and a left surface of the bottom surface 15 of the lower frame unit 11a, respectively.

With the configuration described above, the right front wheel 21 and the left front wheel 31 in the moving direction can be driven independently. That is, the power of the right electric motor 41R is transmitted to the gear box 43R via the motor shaft 42R, and is changed by the gear box 43R in terms of the number of rotation, torque, or a rotation direction to transmit to the axle 21a. Then, the front wheel 21 rotates due to the rotation of the axle 21a. The transmission of power from the left electric motor 41L to the front wheel 31 is the same as the operation of the right electric motor described above.

In a case where the numbers of rotation of the right and left electric motors 41R and 41L are the same, the moving vehicle 1A moves forward or backward insofar as a gear ratio (deceleration ratio) of the gear box 43R and a gear ratio of the gear box 43L are the same. In the case of changing the speed of the moving vehicle 1A, the speed may be changed while keeping a gear ratio of the gear box 43R and a gear ratio of the gear box 43L at the same value.

In addition, in the case of changing the moving direction, the gear ratio of the gear box 43R and the gear ratio of the gear box 43L are changed to maintain a difference between the number of rotation of the right front wheel 21 and the number of rotation of the left front wheel 31. By making the rotation directions of the right and left wheels opposite to each other or making the rotation speeds of the right and left wheels the same as a result of changing the rotation direction of output from each of the gear boxes 43R and 43L, stationary rotation with a midpoint MP of the first axle line $P_1$ of the pair of front wheels 21 and 31 as a stationary rotation center point is possible.

In the case of causing the moving vehicle 1A to perform stationary rotation, since a steering mechanism that makes the angles of the front and rear wheels changeable is not provided, resistance applied to the wheels becomes larger as the wheel base WB becomes larger. Therefore, it is desirable to have large drive torque for rotation. However, since each of gear ratios of the gear boxes 43R and 43L is changeable, large torque can be applied to the wheels simply by reducing the numbers of rotation of the front wheels 21 and 31 during rotation.

For example, in a case where the number of teeth of a gear on a motor shaft 42R side is set to 10, the number of teeth of an intermediate gear is set to 20, and the number of teeth of a gear on an axle 21b side is set to 40 as a gear ratio of the gear box 43R, the number of rotation of the axle 21b becomes one fourth of the number of rotation of the motor shaft 42R and torque that is four times larger is obtained. Since larger torque can be obtained by selecting a gear ratio that makes the number of rotation smaller, rotation is possible even in the case of a road surface which applies large resistance to the wheels, such as rough terrain and sandy terrain.

Herein, to describe the wheels of the moving vehicle according to the disclosure, different wheels are used for the front wheels 21 and 31 and for the rear wheels 22 and 32.

As illustrated in FIG. 2, the left front wheel 31 has a wheel body 31Wa and a tire 31Wb that is attached to an outer circumferential portion of the wheel body 31Wa and is filled with air. The same is applied to the right front wheel 21.

In addition, the left rear wheel 32 is configured of a wheel with rollers having a wheel body 32Wa and a plurality of rollers 32Mb provided on an outer circumferential portion of the wheel body 32Wa. The same is applied to the right rear wheel 22. The "wheel with rollers" described herein includes omni wheels (registered trademark) and the Mecanum wheels.

The disclosure is not limited to the embodiment illustrated in the drawings. The disclosure includes an embodiment, in which the right and left front wheels 21 and 31 are configured of wheels with rollers and the rear wheels 22 and 32 on the right and left are configured of tires filled with air (not illustrated), but the configuration, in which the right and left front wheels 21 and 31 are configured of tires filled with air and the rear wheels 22 and 32 on the right and left are configured of wheel with rollers, is more desirable for the following reason.

Figure 6A:
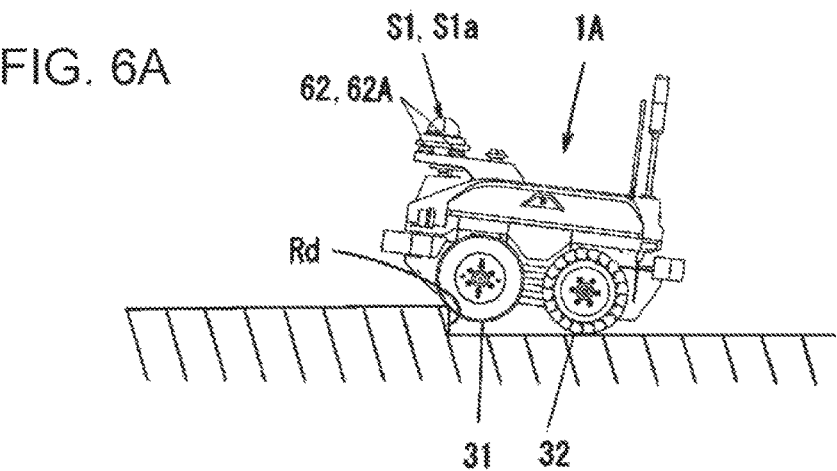
FIGS. 6A to 6C illustrate a traveling state of the moving vehicle of Embodiment 1.
Figure 6B:
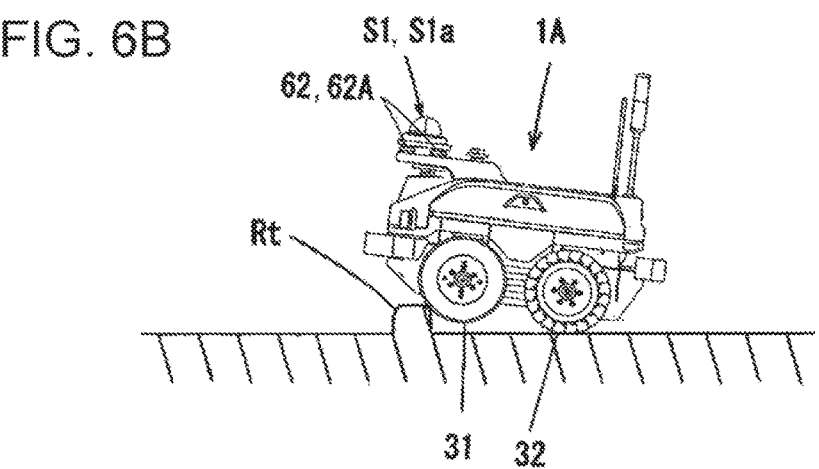
Figure 6C:
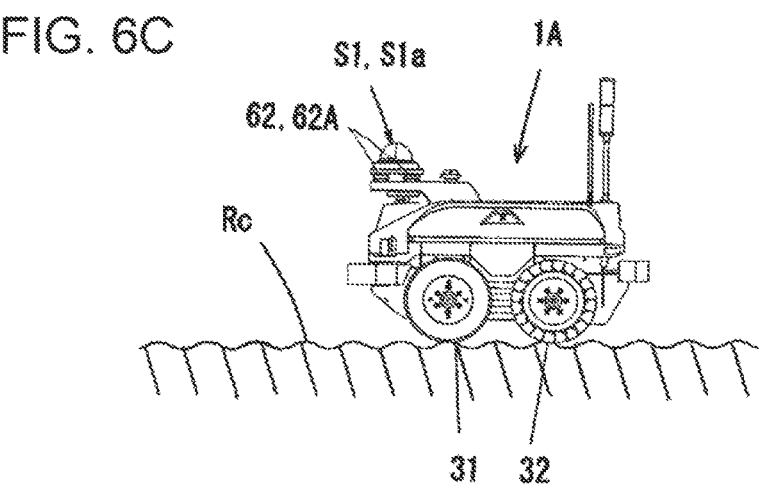

FIGS. 6A to 6C illustrate a traveling state of the moving vehicle of Embodiment 1. FIG. 6A illustrates the moving vehicle climbing a step on a road surface, FIG. 6B illustrates the moving vehicle climbing a projected portion on a road surface, and FIG. 6C illustrates the moving vehicle traveling a textured road surface.

As a step Rd illustrated in FIG. 6A, for example, gradual stairs, of which a step or a difference in elevation between a driveway and a footway, of which elevation is slightly higher than the driveway, inside a factory site is small, are assumed.

As a projected portion Rt illustrated in FIG. 6B, for example, car stoppers or unattended bricks and concrete blocks in a parking lot inside the factory site are assumed.

As a textured road surface Rc illustrated in FIG. 6C, for example, a unpaved portion, such as gravel and earth and sand inside the factory site, is assumed.

In the moving vehicle 1A of Embodiment 1, by the front wheels 21 and 31 on the right and left, which are driving wheels, including tires filled with air, the tires of the front wheels 21 and 31 can absorb the vibration of the first and second optical sensors S1 and S2 when traveling the step Rd, the projected portion Rt, or the textured road surface Rc on the road surface illustrated in FIGS. 6A to 6C.

In particular, when the moving vehicle 1A climbs the step Rd and the projected portion Rt illustrated in FIGS. 6A and 6B, the electric motor vehicle chassis 10A receives a large impact force once the front wheels crash into the step Rd and the projected portion Rt. However, the impact force exerted onto the electric motor vehicle chassis 10A can be decreased since the front wheels 21 and 31 configured of tires filled with air can absorb even a large impact force.

When the moving vehicle 1A travels the textured road surface Rc illustrated in FIG. 6C, the front wheels 21 and 31 (tires filled with air) can absorb an impact force in an up-and-down direction even if, for example, the front wheels 21 and 31 fall into a large depression. It is desirable that the tires filled with air are kept at an appropriate pneumatic pressure in order to decrease the impact force.

On the other hand, in a case where the moving vehicle travels the step Rd, the projected portion Rt, and the textured road surface Rc illustrated in FIGS. 6A to 6C by means of, for example, rubber solid tires and a caterpillar, an impact force generated when crashing into the step Rd and the projected portion Rt and an impact force generated when falling into a large depression in the textured road surface Rc can be barely absorbed with the rubber solid tires and the caterpillar and the impact force is directly transmitted to the electric motor vehicle chassis without being decreased.

With this, according to Embodiment 1, the vibration of the first and second optical sensors S1 and S2 disposed at positions which are close to and above the front wheels 21 and 31 decreases. Accordingly, an image blur and an axis shift reduce, and the accuracy of image information and distance information improves. Details of positions at which the first and second optical sensors S1 and S2 are attached will be described later.

In addition, by using wheels with rollers as the rear wheels 22 and 32 on the right and left, the rear wheels 22 and 32 on the right and left can move smoothly in the right-and-left direction during the rotation of the electric motor vehicle chassis 10A. For this reason, when the right and left front wheels 21 and 31 (tires filled with air) are rotated the same number of times in directions opposite to each other, the moving vehicle 1A of Embodiment 1 can smoothly perform stationary rotation with the midpoint MP of the first axle line $P_1$ of the front wheels 21 and 31 as the center even in the case of low torque.

When the right and left front wheels are configured of wheels with rollers, and for example, in a case where there is a step only on one side of the right and left front wheels, a wheel slips due to the rollers of the wheel with rollers climbing the step. As a result, a track on which the moving vehicle travels is likely to shift beyond the assumption. Therefore, it is desirable that tires filled with air (in particular, rubber tires having tread patterns) are disposed on a front wheel side in terms of track stability in addition to impact decreasing.

In addition, as illustrated in FIG. 1B, outer surfaces of the right and left front wheels 21 and 31 and outer surfaces of the rear wheels 22 and 32 on the right and left may be lined up on the same plane.

In a case where the front wheels 21 and 31 have rubber tires (tires filled with air) for a four-wheeled car, since the width of a wheel with rollers is often smaller than the width of a rubber tire in general, intervals between the right and left wheels with rollers can be made wider by adopting the above configuration. As a result, the vibration of the chassis body 11 during traveling can be suppressed and the shaking of the first and second optical sensors S1 and S2 can be suppressed.

In addition, since the gear boxes 43R and 43L are provided between the motor shafts 42R and 42L and the axles 21a and 31a in the moving vehicle 1A, vibration from the front wheels 21 and 31 is not directly transmitted to the motor shafts. When a clutch that performs transmission and separation (block) of power to the gear boxes 43R and 43L is provided and the electric motors 41R and 41L are not electrically connected, it is desirable to block power transmission between the electric motors 41R and 41L and the axles 21a and 31a, which are drive shafts. Accordingly, even if a force is exerted to the chassis body 11 during stoppage and the wheels rotate, the rotation is not transmitted to the electric motors 41R and 41L. Therefore, counter electromotive force is not generated in the electric motors 41R and 41L and circuits for the electric motors 41R and 41L are not damaged.

A wide accommodation space 16 extending from a middle position of the bottom surface to, for example, a rear end of a car body can be secured on the bottom surface 15 of the chassis body 11 since the bearings 44R and 44L are merely disposed on rear wheels 22 and 32 sides of the bottom surface 15 although on front wheels 21 and 31 sides of the bottom surface 15 of the chassis body 11, the two electric motors 41R and 41L are disposed on the right and left in the moving direction and the gear boxes 43R and 43L are disposed on the right and left of the electric motors 41R and 41L respectively, as described above.

Each of the electric motors 41R and 41L has, for example, the battery (rechargeable battery) 40, such as a lithium ion battery, as a power source, and the battery 40 is provided in the accommodation space 16. Specifically, the battery 40 has, for example, a rectangular shape and can be placed at a substantially middle position of the bottom surface 15 as illustrated in FIG. 1B. In addition, it is desirable that the rear surface 14 of the lower frame unit 11a of the chassis body 11 is configured, for example, so as to be openable and closable with respect to an upper surface or the bottom surface 15 and thus putting the battery 40 into and out of the accommodation space 16 is easy. Accordingly, the large-capacity battery 40 for allowing the realization of traveling for long hours can be mounted in the accommodation space 16 of the chassis body 11. In addition, work, such as the replacement, charging, and inspection of the battery 40, can be carried out easily from the rear surface 14. Since the battery 40 can be disposed on the bottom surface 15, an electric motor vehicle, of which the chassis body 11 has a low centroid and which can travel stably, can be obtained.

First Vibration Absorbing Member

FIG. 4 is a perspective view illustrating the first vibration absorbing member in the moving vehicle of Embodiment 1.

In the moving vehicle 1A of Embodiment 1, helical vibration isolators 61A illustrated in FIG. 4 are used as the first vibration absorbing members 61. A plurality of types of helical vibration isolators, including a type illustrated in FIG. 2, are commercially available. Among the commercial products, a helical vibration isolator can be selectively used in the moving vehicle 1A of Embodiment 1.

In Embodiment 1, the commercially available helical vibration isolators 61A, which fall under a type illustrated in FIG. 2, are used as the first vibration absorbing members 61.

The helical vibration isolators 61A each have one wire $61A_1$ and a pair of support plates $61A_2$ having a plurality of insertion holes $61A_{221}$, into which the wire $61A_1$ is inserted.

To describe details, the support plates $61A_2$ have rectangular substrate portion $61A_{21}$ having hole portions for attachment $61A_{211}$ at both ends and folded portions $61A_{22}$ vertically provided along a pair of long sides of the substrate portions $61A_{21}$, and the plurality of insertion holes $61A_{221}$ are formed in the folded portions $61A_{22}$ so as to be arranged in a line.

The helical vibration isolators 61A are configured by inserting the wire $61A_1$ into the plurality of insertion holes $61A_{221}$ of the pair of support plates $61A_2$ so as to be wound in a spiral by restricting both ends of the wire $61A_1$ coming off from the insertion holes $61A_{221}$. The directions of the spiral of the wire $61A_1$ on one end side and the other end side of the wire $61A_1$ are opposite to each other.

In the moving vehicle 1A of Embodiment 1,the four helical vibration isolators 61A are provided as the first vibration absorbing members 61 so as to connect tour corners of the upper surface of the rectangular lower frame unit 11a and four corners of a lower surface of the rectangular upper frame unit 11b together. At this time, each of the helical vibration isolators 61A is fixed by passing bolts through the pair of hole portions for attachment $61A_{211}$ of the lower support plate $61A_2$ and hole portions for attachment (not illustrated) of the lower frame unit 11a and fastening by means of nuts. The same applies to connection of the upper support plate $61A_2$ and the upper frame unit 11b.

The first vibration absorbing members 61 are provided between the lower frame unit 11a and the upper frame unit 11b in order mostly to absorb vibration in the up-and-down direction, and the helical vibration isolators 61A that are effective in absorbing the vibration are used. That is, the helical vibration isolators 61A are used in order to make the vibration of the lower frame unit 11a unlikely to be transmitted to the upper frame unit 11b in which the first and second optical sensors S1 and S2 are provided.

Second Vibration Absorbing Member

FIG. 5 is a perspective view illustrating the second vibration absorbing member in the moving vehicle of Embodiment 1.

In the moving vehicle 1A of Embodiment 1, small-sized rope vibration isolators 62A illustrated in FIG. 5 are used as the second vibration absorbing members 62. A plurality of types of small-sized rope vibration isolators, including a type illustrated in FIG. 5, are commercially available. Among the commercial products, a small-sized rope vibration isolator can be selectively used in the moving vehicle 1A of Embodiment 1.

In Embodiment 1, the commercially available small-sized rope vibration isolators 62A, which fall under a type illustrated in FIG. 5, are used as the second vibration absorbing members 62.

The small-sized rope vibration isolators 62A each have one wire $62A_1$ and a pair of support plates $62A_2$ having a plurality of insertion holes $62A_{221}$, into which the wire $62A_1$ is inserted.

To describe details, the support plates $62A_2$ have a rectangular substrate portion $62A_{21}$ having hole portions for attachment $62A_{211}$ at a middle portion and a pair of cylindrical bulging portions $62A_{22}$ provided along opposing sides of the substrate portion $62A_{21}$, and cavities inside the pair of bulging portion $62A_{22}$ are the insertion holes $62A_{221}$.

The small-sized rope vibration isolators 62A are configured by inserting the wire $62A_1$ in each of the insertion holes $62A_{221}$ of the pair of support plates $62A_2$ opposing each other and fixing both ends of the wire $62A_1$ so as not to come out from the same insertion holes $62A_{221}$. At this time, both of the bulging portions $62A_{22}$ of the support plates $62A_2$ oppose each other, a state where a longitudinal direction of the insertion hole $62A_{221}$ in one support plate $62A_2$ and a longitudinal direction of the insertion hole $62A_{221}$ in the other support plate $62A_2$ are orthogonal to each other is maintained, and in this state, the pair of support plates $62A_2$ are connected to each other by means of the wire $62A_1$.

In the moving vehicle 1A of Embodiment 1, the four small-sized rope vibration isolators 62A are provided as the second vibration absorbing members 62 so as to connect the front end portion of the upper surface of the upper frame unit 11b and a lower surface of a rectangular attachment plate 75 for attaching the first optical sensor S1 to the upper frame unit 11b together. At this time, each of the small-sized rope vibration isolators 62A is fixed by passing bolts through the hole portions for attachment $62A_{211}$ of the lower support plate $62A_2$ and hole portions for attachment (not illustrated) of the upper frame unit 11b and fastening by means of nuts. The same applies to connection of the upper support plate $62A_2$ and the attachment plate 75.

The second vibration absorbing members 62 are provided between the upper frame unit 11b and the first optical sensor S1 in order to uniformly absorb vibration in a three-dimensional direction (all directions) by the wire $62A_1$ being wound in the front-and-rear direction, in the right-and-left direction, and in the up-and-down direction, and the small-sized rope vibration isolators 62A that sire effective in absorbing the vibration are used. That is, the small-sized rope vibration isolators 62A are used in order to make the vibration of the upper frame unit 11b unlikely to be transmitted to the first optical sensor S1.

Positions of First and Second Optical Sensors

As illustrated in FIG. 1A, FIG. 2, and FIG. 3, the distance detecting unit S2a is disposed as the second optical sensor S2 on the front end portion of the upper frame unit 11b of the chassis body 11.

In addition, an eave portion $11b_1$ that covers an upper portion of the second optical sensor S2 is provided on the upper frame unit 11b, and the imaging unit S1a is disposed as the first optical sensor S1 on the eave portion $11b_1$ via the four second vibration absorbing members 62 and the attachment plate 75.

To describe further details, the first and second optical sensors S1 and S2 are disposed, in planar view, at positions nearby the axle line of the front wheels 21 and 31 (first shaft center $P_1$) on the center line CL, specifically, between the first shaft center $P_1$ and the front end portion of the upper frame unit 11*b*. According to the configuration, the shaking of the first and second optical sensors S1 and S2 during stationary rotation can be suppressed. In addition, the blocking of the fields of view of the first and second optical sensors S1 and S2 in horizontal and vertical directions can be minimized and wide fields of view of the first and second optical sensors S1 and S2 can be secured.

Shaking of Moving Vehicle During Traveling

By providing the first vibration absorbing members 61 between the lower frame unit 11*a* and the upper frame unit 11*b*, the vibration of the lower frame unit 11*a*, which occurs during traveling of the moving vehicle 1A or during rotation (in particular, during stationary rotation) of the moving vehicle 1A on the textured road surface, is unlikely to be transmitted to the second optical sensor S2 via the upper frame unit 11*b*. Accordingly, the distance detecting unit S2*a*, which is the second optical sensor S2, can measure a distance to a measurement point with high accuracy.

In addition, by providing the second vibration absorbing members 62 between the upper frame unit 11*b* and the first optical sensor S1, the vibration of the upper frame unit 11*b*, which is attenuated and transmitted from the lower frame unit 11*a* is unlikely to be transmitted to the first optical sensor S1. Accordingly, the blur of an image captured by the imaging unit S1*a*, which is the first optical sensor S1, can be suppressed.

By disposing the first optical sensor S1 adjacent to the midpoint MP of the first shaft center $P_1$ of the front wheels 21 and 31, which is a stationary rotation center point, the rotation radius of the first optical sensor S1 during stationary rotation is small and the first optical sensor is unlikely to receive the effect of centrifugal force. Accordingly, an image blur is synergistically suppressed.

EMBODIMENT 2

Figure 7A:
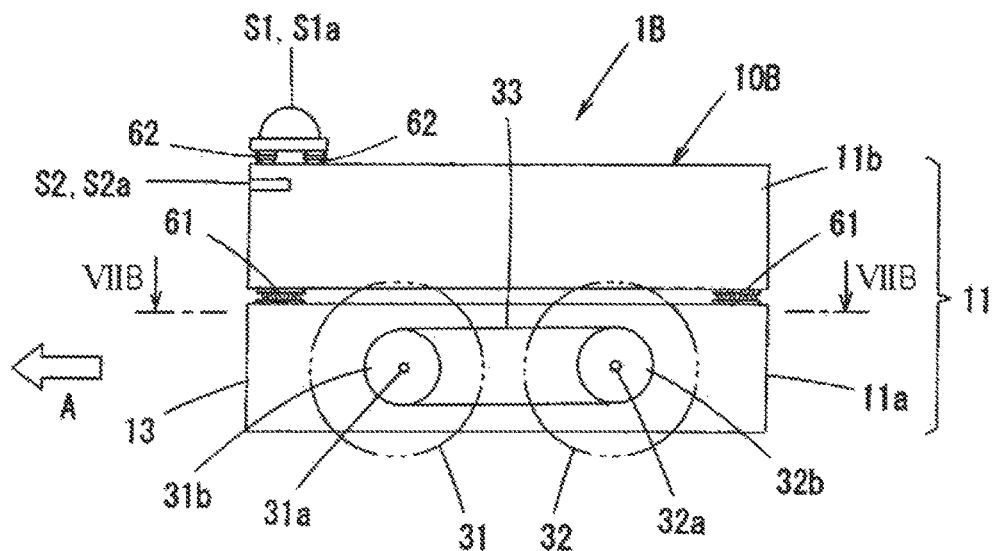
FIGS. 7A and 7B are views illustrating a schematic configuration of an electric motor vehicle chassis in Embodiment 2 of a moving vehicle of the disclosure.
Figure 7B:
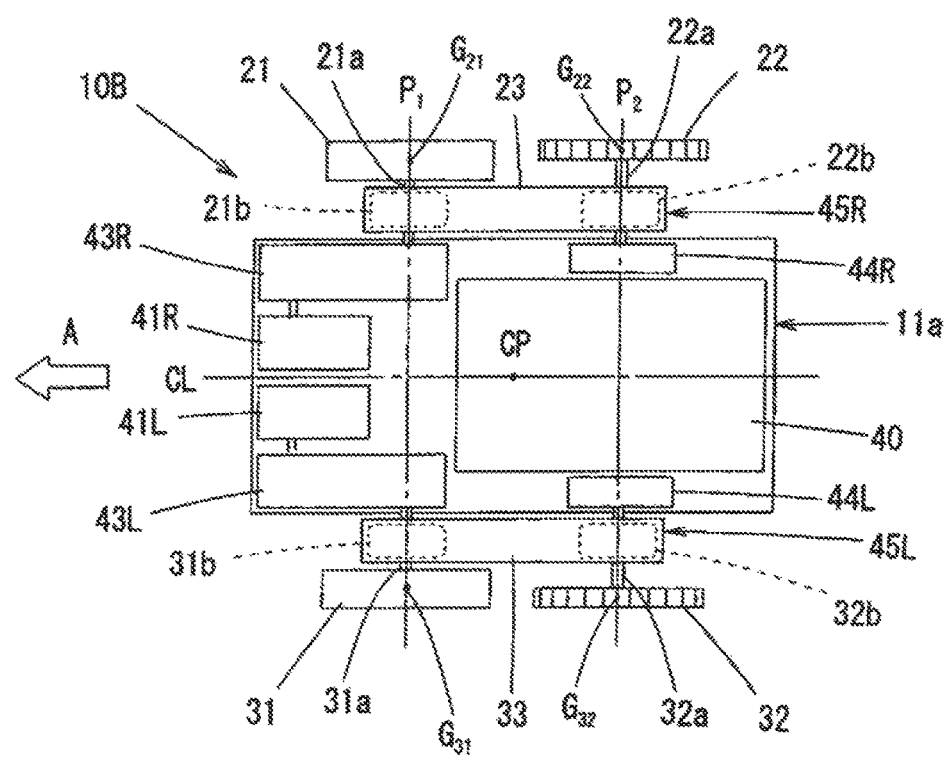

FIGS. 7A and 7B are views illustrating a schematic configuration of an electric motor vehicle chassis in Embodiment 2 of a moving vehicle of the disclosure, FIG. 7A is a left side view, and FIG. 7B is a sectional view taken along line VIIB-VIIB of FIG. 7A. In FIGS. 7A and 7B, elements which are the same as the elements in FIG. 1A to FIG. 5 will be assigned with the same reference signs.

Hereinafter, points of Embodiment 2 that are different from those of Embodiment 1 will generally be described.

A moving vehicle 1B of Embodiment 2 includes an electric motor vehicle chassis 10B that is formed by providing the electric motor vehicle chassis 10A in the moving vehicle 1A of Embodiment 1 with a right power transmission mechanism 45R which connects the front and rear wheels 21 and 22 on the right together and a left power transmission mechanism 45L which connects the front and rear wheels 31 and 32 on the left together.

That is, the moving vehicle 1B of Embodiment 2 has a configuration in which each of the pair of right and left front wheels 21 and 31 and the pair of right and left rear wheels 22 and 32 is in tandem with each other by means of belts 23 and 33, which are power transmission members. The rest of configuration is the same as that of Embodiment 1.

Specifically, the right power transmission mechanism 45R is configured as follows.

A pulley 21*b* is provided for the axle 21*a* of the right front wheel 21 and a pulley 22*b* is provided for the axle 22*a* of the rear wheel 22. In addition, for example, the belt 23 of which an inner surface side has protrusions that engage with a plurality of grooves provided on outer peripheral surfaces of the pulleys 21*b* and 22*b* is wound around between the pulley 21*b* of the front wheel 21 and the pulley 22*b* of the rear wheel 22.

The left power transmission mechanism 45L is configured similarly to the right power transmission mechanism 45R. A pulley 31*b* is provided for the axle 31*a* of the left front wheel 31 and a pulley 32*b* is provided for the axle 32*a* of the rear wheel 32. The belt 33, which has the same structure as that of the belt 23, is wound around between the pulley 31*b* of the front wheel 31 and the pulley 32*b* of the rear wheel 32.

Therefore, since the front wheels and rear wheels on the right and left (21 and 22, and 31 and 32) are connected and driven by the belts (23 and 33), wheels on one side may be driven. In Embodiment 2, a case where the front wheels 21 and 31 are driven will be given as an example. In a case where wheels on one side are set as driving wheels, the other wheels function as driven wheels that are driven without slipping due to the belts, which are the power transmission members.

In addition to the use of the pulleys and the belts that have protrusions which engage with a plurality of grooves on outer peripheral surfaces of the pulleys, for example, a sprocket and a chain that engages with the sprocket may be used as the power transmission members that connect and drive the front wheels and the rear wheels. In a case where slipping can be allowed, a pulleys and a belt with strong friction may be used as the power transmission members. However, the power transmission members are configured such that the number of rotation of driving wheels and the number of rotation of driven wheels are the same.

In FIGS. 7A and 7B, the front wheels (21 and 31) correspond to driving wheels, and the rear wheels (22 and 32) correspond to driven wheels.

With the configuration described above, the front and rear wheels 21 and 22 on the right and the front and rear wheels 31 and 32 on the left in the moving direction can be driven independently. That is, the power of the right electric motor 41R is transmitted to the gear box 43R via the motor shaft 42R, and is changed by the gear box 43R in terms of the number of rotation, torque, or a rotation direction to transmit to the axle 21*a*. The front wheel 21 rotates with the rotation of the axle 21*a*, the rotation of the axle 21*a* is transmitted to the rear wheel 22 via the pulley 21*b*, the belt 23, and the pulley 22*b*, and the rear wheel 22 is rotated. The transmission of power from the left electric motor 41L to the front wheel 31 and the rear wheel 32 is the same as the operation of the right electric motor described above.

In a case where the numbers of rotation of the right and left electric motors 41R and 41L are the same, the moving vehicle 1B moves forward or backward insofar as a gear ratio (deceleration ratio) of the gear box 43R and a gear ratio of the gear box 43L are the same. In the case of changing the speed of the moving vehicle 1B, the speed may be changed while keeping a gear ratio of the gear box 43R and a gear ratio of the gear box 43L at the same value.

In addition, in the case of changing the moving direction, the gear ratio of the gear box 43R and the gear ratio of the gear box 43L are changed to maintain a difference between the number of rotation of the right front wheel 21 and the rear wheel 22 and the number of rotation of the left front wheel 31 and the rear wheel 32. By making the rotation directions of the right and left wheels opposite to each other or making the rotation speeds of the right and left wheels the same as a result of changing the rotation direction of output from each of the gear boxes 43R and 43L, stationary rotation with a center point CP in a rectangular area surrounded by four grounding center points G21, G31, G22, and G32 of the pair of front wheels 21 and 31 and the pair of rear wheels 22 and 32 as the center is possible. In the case of Embodiment 2, the middle portion of the chassis body 11 is configured so as to substantially match the center point CP.

As described above, the four wheels are driven by connecting each of the front wheels on the right and left and the rear wheels on the right and left is connected together with the power transmission members and by making the wheels rotatable with the two electric motors disposed on a front wheel side. Therefore, there is no need to provide electric motors dedicated to the rear wheels and gear boxes dedicated to the rear wheels, which are desirable to be provided between the electric motors and the rear wheels, and thus a space for providing the electric motors dedicated to the rear wheels and the gear boxes dedicated to the rear wheels can be reduced.

According to the moving vehicle 1B of Embodiment 2, a four-wheel drive vehicle, in which the front and rear wheels 31 and 32 on the left are rotation-driven by the left power transmission mechanism 45L and the front and rear wheels 21 and 22 on the right are rotation-driven by the right power transmission mechanism 45R, can be obtained. As a result, since the climbing force of the driven wheels with rollers (rear wheels 22 and 32), for example, in the case of climbing a step on a road surface, or when rotating on a bumpy road, is increased, the vibration of the chassis body 11 can be suppressed and the shaking of the first and second optical sensors S1 and S2 can be suppressed.

EMBODIMENT 3

Figure 8:
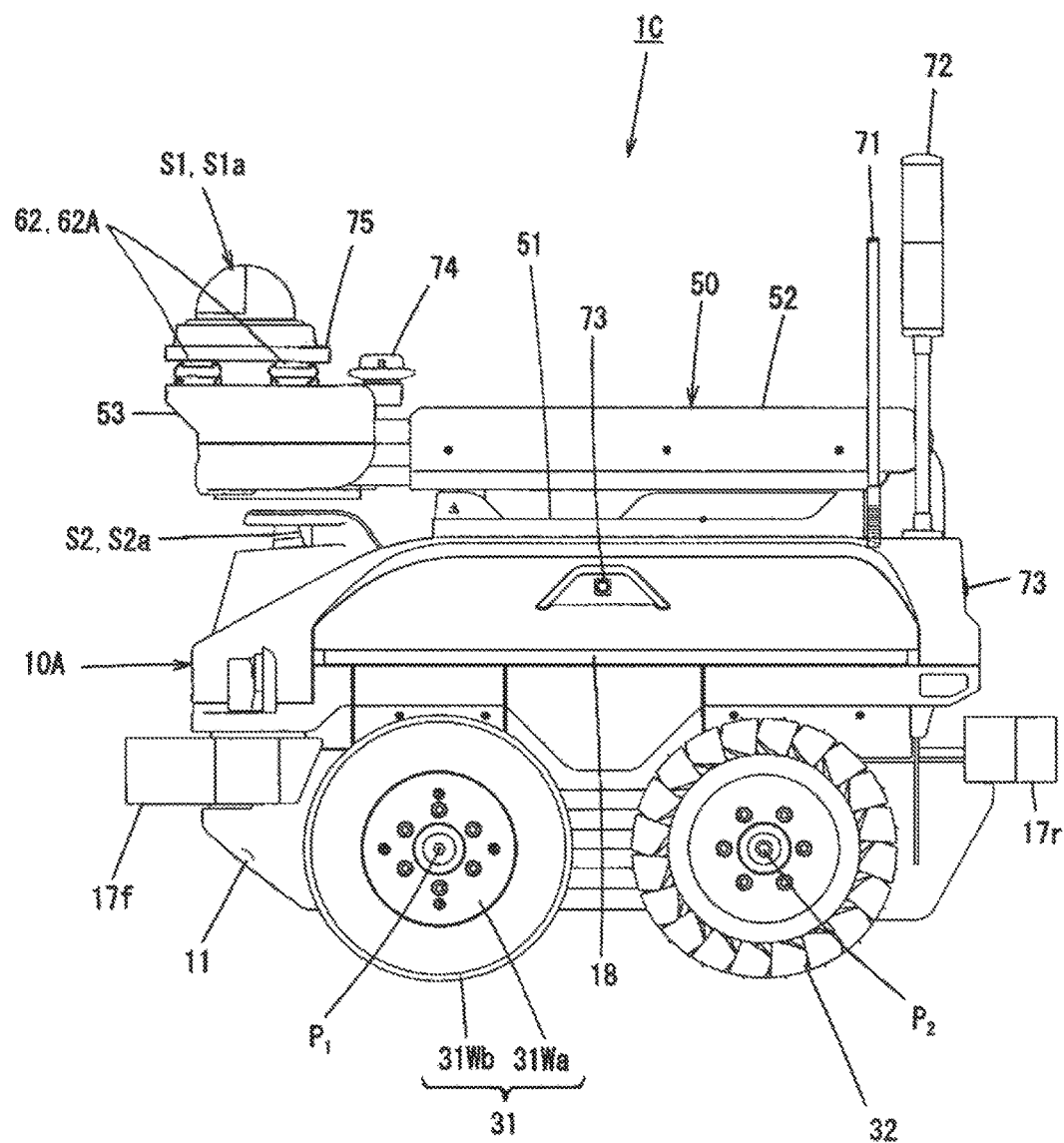
FIG. 8 is a left side view illustrating a moving vehicle of Embodiment 3.
Figure 9:
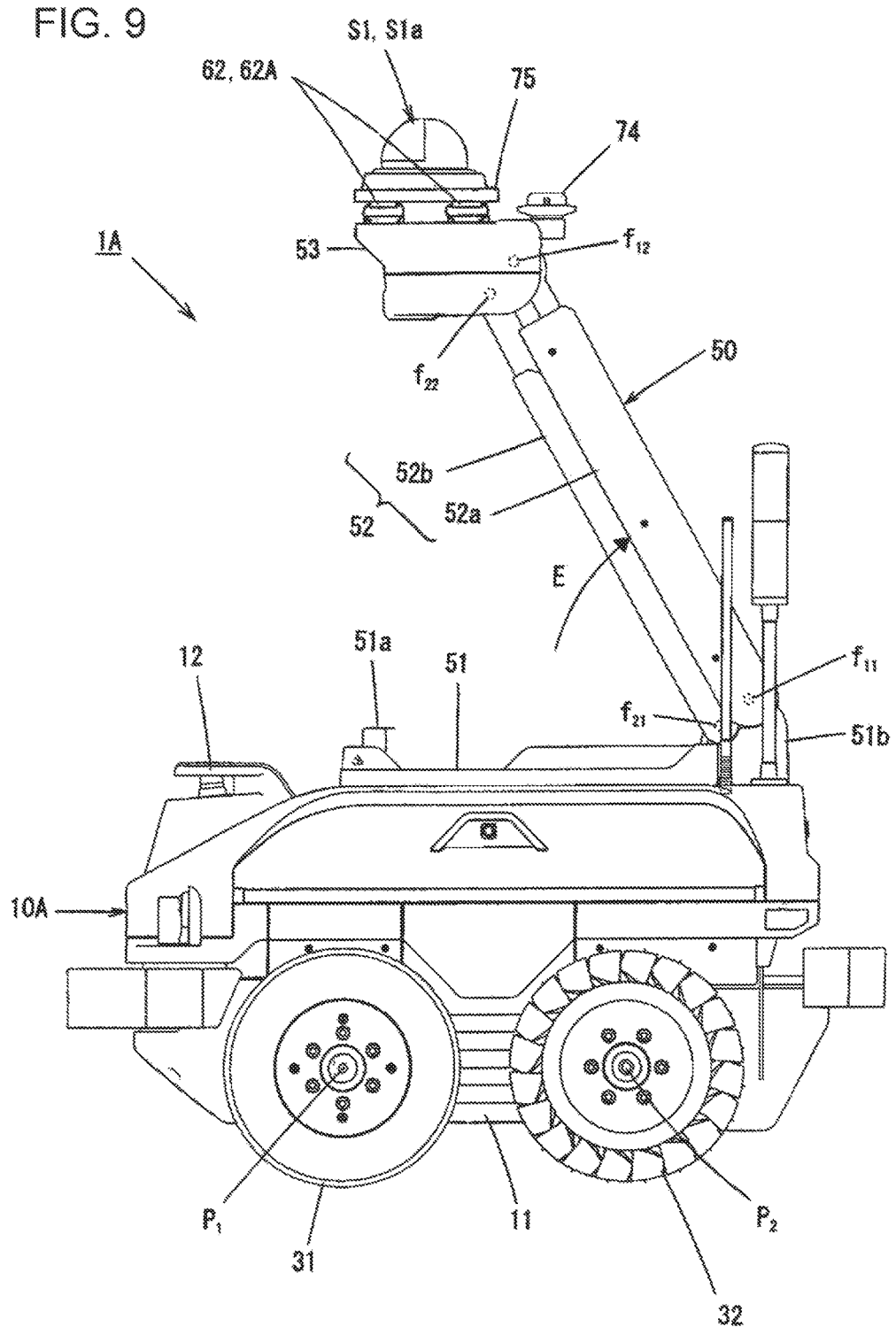
FIG. 9 is a left side view illustrating an imaging unit raised state in the moving vehicle of FIG. 8.

FIG. 8 is a left side view illustrating a moving vehicle of Embodiment 3, and FIG. 9 is a left side view illustrating an imaging unit raised state in the moving vehicle of FIG. 8. In FIGS. 8 and 9, elements which are the same as the elements in FIG. 2 will be assigned with the same reference signs.

A moving vehicle 1C of Embodiment 3 is mostly the same as the moving vehicle 1A of Embodiment 1 except that an elevating mechanism 50 which, raises and lowers the imaging unit S1a is included.

Hereinafter, portions of Embodiment 3 that are different from, those of Embodiment 1 will generally be described.

As illustrated in FIGS. 8 and 9, a link mechanism that has a boom 52 which swings in the up-and-down and in the front-and-rear direction, specifically, a parallel link mechanism is used as the elevating mechanism 50 in Embodiment 3.

That is, the elevating mechanism 50 includes an underframe 51 that is fixed onto the chassis body 11 and extends in the front-and-rear direction, the boom 52 provided on a rear end portion of the underframe 51 so as to be swingable around a right-left shaft center, a balancing unit 53 provided on a tip of the boom 52, and a telescopic cylinder (not illustrated) that swings the boom 52, which is provided, within the underframe 51, up and down. The imaging unit S1a, which is the first optical sensor S1, is provided on the balancing unit 53 via the small-sized rope vibration isolators 62A and the attachment plate 75, which are the second vibration absorbing members 62. The GPS antenna 74 is also provided on the balancing unit 53.

The underframe 51 has a support unit S1a that supports the boom 52 lowered to the front end portion and has a pivot unit 51b that pivotally supports a base end portion of the boom 52 on the rear end portion.

The boom 52 has a frame 52a and a balancing unit supporting rod 52b provided along the frame 52a.

A base end portion of the frame 52a is fixed to a first base end shaft $f_{11}$ that is pivotally fitted, to the pivot unit 51b of the underframe 51 so as to be rotatable, and a tip portion of the frame 52a is pivotally fitted to the balancing unit 53 via a first tip shaft $f_{12}$.

A base end portion of the balancing unit supporting rod 52b is fixed to a second base end shaft $f_{21}$ that is pivotally fitted to the pivot unit 51b of the underframe 51, and a tip portion of the balancing unit supporting rod 52b is pivotally fitted to the balancing unit 53 via a second tip shaft $f_{22}$.

An electric, hydraulic, or pneumatic pressure cylinder can be used as a telescopic cylinder (not illustrated).

A base end portion of the telescopic cylinder is pivotally fitted to the underframe 51 or the chassis body 11 so as to be swingable up and down and a tip portion of the telescopic cylinder is connected to the first base end shaft $f_{11}$ via an arm (not illustrated). At this time, the tip portion of the telescopic cylinder is pivotally fitted to one end of the arm, and the other end of the arm is fixed to the first base end shaft $f_{11}$.

The balancing unit 53 is a balancing device that stably maintains a normal posture of the imaging unit S1a and a normal posture of the GPS antenna 74 even when the boom 52 swings in the up-and-down direction.

Next, the operation of the elevating mechanism 50 will be described.

FIG. 8 illustrates a state where the elevating mechanism 50 is lowered, and at this time, the telescopic cylinder is extended. In a case where the elevating mechanism 50 is raised, the telescopic cylinder is retracted. Accordingly, the arm pivotally fitted to the tip portion of the telescopic cylinder is drawn to the front, and the arm, the first base end shaft $f_{11}$, and the frame 52a integrally swing upwards (arrow E direction). In addition, as illustrated in FIG. 9, by the frame 52a swinging upwards, the balancing unit supporting rod 52b connected to the tip portion of the frame 52a via the balancing unit 53 is lifted upwards (arrow E direction).

At this time, since the second tip shaft $f_{22}$ of the balancing unit 53 is drawn to the balancing unit supporting rod 52b by the balancing unit supporting rod 52b shifting a position thereof in parallel with the frame 52a, a normal posture of the balancing unit 53 and normal postures of the imaging unit S1a and the GPS antenna 74 provided on the balancing unit are maintained from a lowered position to a raised position.

In addition, as the telescopic cylinder extends, the boom 52 operates in a manner opposite to the above operation and comes from a raised state of FIG. 9 to a lowered state of FIG. 8.

As described above, the elevating mechanism 50 causes the imaging unit S1a to straddle the first axle line $P_1$ and to move to the front and rear.

According to the moving vehicle 1C of Embodiment 3, the raised imaging unit S1a can image a wide area in front from a high place since the imaging unit S1a is raised and lowered while stably maintaining a normal posture by the boom 52 of the elevating mechanism 50 swinging in the up-and-down direction. At this time, since the planar position, of the raised imaging unit S1a is adjacent to the midpoint MP of the front wheels 21 and 31 (refer to FIGS. 1A and 1B), the imaging unit S1a rotates with a small rotation radius when the moving vehicle 1C rotates with the midpoint MP as the center. Accordingly, since the shaking of the imaging unit S1a during rotation is mitigated and the shaking is further mitigated by the first and second vibration absorbing members 61 and 62, image information with less blur can be obtained even during rotation.

Modification Example 1 of Embodiment 3

Figure 10:
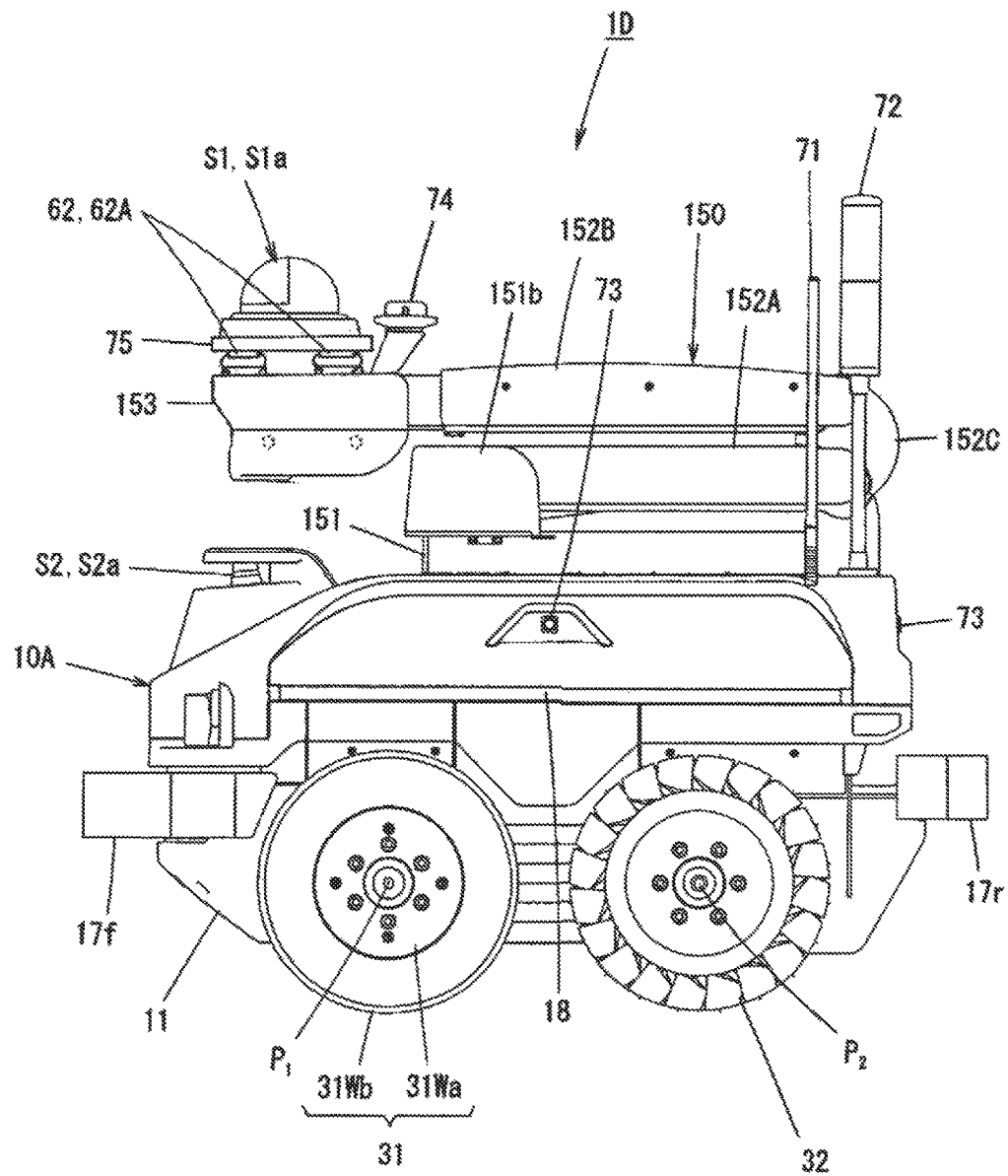
FIG. 10 is a left side view illustrating Modification example 1 of a moving vehicle of Embodiment 3.

FIG. 10 is a left side view illustrating Modification example 1 of a moving vehicle of Embodiment 3,and FIG. 11 is a left side view illustrating an imaging unit raised state in the moving vehicle of FIG. 10. In FIGS. 10 and 11, elements which are the same as the elements in FIG. 2 will be assigned with the same reference signs.

The moving vehicle 1C of Embodiment 3 illustrated in FIGS. 8 and 9 may use an elevating mechanism illustrated in FIGS. 10 and 11.

A single-arm-type pantograph mechanism is used as an elevating mechanism 150 in a moving vehicle 1D of Modification example 1 illustrated in FIGS. 10 and 11.

That is, the elevating mechanism 150 includes an underframe 151 that is fixed onto the chassis body 11 and extends in the front-and-rear direction, a first boom 152A provided on a front end portion 151b of the underframe 151 so as to be swingable around a right-left shaft center, a second boom 152B provided on a tip portion of the first boom 152A so as to be swingable around a right-left shaft center, a hinge unit 152C that connects the first boom 152A and the second boom 152B together, the balancing unit 153 provided on a tip of the second boom 152B, and a telescopic cylinder (not illustrated) that swings the first boom 152A, which is provided within the underframe 151, up and down. The imaging unit S1a, which is the first optical sensor S1, is provided on the balancing unit 153 via the small-sized rope vibration isolators 62A and the attachment plate 75, which are the second vibration absorbing members 62. The GPS antenna 74 is also provided on the balancing unit 153.

The underframe 151 has a pivot unit 151b that pivotally supports a base end portion of the first boom 152A on a rear end portion.

The first boom 152A has a first lower frame 152Aa, a second lower frame 152Ab provided along the first lower frame 152Aa, and a counterbalancing rod 152Ac.

The second boom 152B has an upper frame 152Ba and a balancing unit supporting rod 152Bb provided along the upper frame 152Ba.

A base end portion of the first lower frame 152Aa is fixed to a lower first base end shaft (not illustrated) that is pivotally fitted to the pivot unit 151b so as to be rotatable, and a tip portion of the first lower frame 152Aa is pivotally fitted to the hinge unit 152C via a lower first tip shaft $f_{112}$.

A base end portion of the second lower frame 152Ab is fixed to a lower second base end shaft (not illustrated) that is pivotally fitted to the pivot unit 151b so as to be rotatable, and a tip portion of the second lower frame is pivotally fitted to the hinge unit 152C via a lower second tip shaft $f_{114}$.

A base end portion of the counterbalancing rod 152Ac is fixed to a lower third base end shaft (not illustrated) that is pivotally fitted to the pivot unit 151b so as to be rotatable, and a tip portion of the counterbalancing rod 152Ac is pivotally fitted to a bent base end portion (not illustrated) of the upper frame 152Ba via a lower third tip shaft (not illustrated).

A base end portion of the upper frame 152Ba is fixed to an upper first base end shaft fin that is pivotally fitted to the pivot unit 151b, and a tip portion of the upper frame 152Ba is pivotally fitted to the balancing unit 153 via an upper first tip shaft $f_{118}$.

A base end portion of the balancing unit supporting rod 152Bb is fixed to an upper second base end shaft $f_{119}$ that is pivotally fitted to the pivot unit 151b, and a tip portion of the balancing unit supporting rod 152Bb is pivotally fitted to the balancing unit 153 via an upper second tip shaft $f_{120}$.

An electric, hydraulic, or pneumatic pressure cylinder can be used as a telescopic cylinder (not illustrated) as in Embodiment 1.

A base end portion of the telescopic cylinder is pivotally fitted to the underframe 151 or the chassis body 11 so as to be swingable up and down and a tip portion of the telescopic cylinder is connected to the lower first base end shaft via an arm (not illustrated). At this time, the tip portion of the telescopic cylinder is pivotally fitted to one end of the arm, and the other end of the arm is fixed to the lower first base end shaft.

The balancing unit 153 is a balancing device that stably maintains a normal posture of the imaging unit S1a and a normal posture of the GPS antenna 74 even when the first and second booms 152A and 152B swing in the up-and-down direction, as in Embodiment 1.

Next, the operation of the elevating mechanism 150 will be described.

FIG. 10 illustrates a state where the elevating mechanism 150 is lowered, and at this time, the telescopic cylinder is extended. In a case where the elevating mechanism 150 is raised, the telescopic cylinder is retracted. Accordingly, as illustrated in FIG. 11, the arm pivotally fitted to the tip portion of the telescopic cylinder is drawn to the front, and the arm, the lower first base end shaft, and the first lower frame 152Aa integrally swing upwards (arrow F direction). In addition, by the first lower frame 152Aa swinging upwards, the second lower frame 152Ab connected to the tip portion of the first lower frame 152Aa via the hinge unit 152C is lifted, upwards (arrow F direction).

At this time, since the lower second tip shaft $f_{114}$ of the hinge unit 152C is drawn to the second lower frame 152Ab by the second lower frame 152Ab shifting a position thereof in parallel with the first lower frame 152Aa, the bent base end portion of the upper frame 152Ba is drawn to the counterbalancing rod 152Ac and thus the upper frame 152Ba swings and rises in an arrow G direction. At the same time, the balancing unit supporting rod 152Bb connected to the tip portion of the upper frame 152Ba via the balancing unit 153 is lifted.

At this time, since the upper second tip shaft $f_{120}$ of the balancing unit 153 is drawn to the balancing unit supporting rod 152Bb by the balancing unit supporting rod 152Bb shifting a position thereof in parallel with the upper frame 152Ba, a normal posture of the balancing unit 153 and normal postures of the imaging unit S1a and the GPS antenna 74 provided on the balancing unit are maintained from a lowered position to a raised position.

As the telescopic cylinder extends, the first and second booms 152A and 152B operate in a manner opposite to the above operation and come from, a raised state of FIG. 11 to a lowered state of FIG. 10.

Also in the moving vehicle ID of Modification example 1 of Embodiment 3, the imaging unit S1a can be raised and lowered while stably maintaining a normal posture by the first and second booms 152A and 152B of the elevating mechanism 150 swinging in the up-and-down direction. In this case, it is possible for the imaging unit S1a to capture an image from a higher place than in the case of the elevating mechanism 50 illustrated in FIG. 8. At this time as well, since the planar position of the raised imaging unit S1a is adjacent to the midpoint MP of the front wheels 21 and 31 (refer to FIGS. 1A and 1B), the imaging unit S1a rotates with a small rotation radius when the moving vehicle ID rotates with the midpoint MP as the center. Accordingly, since the shaking of the imaging unit S1a during rotation is mitigated and the shaking is further mitigated by the first and second vibration absorbing members 61 and 62, image information with less blur can be obtained even during rotation.

Modification Example 2 of Embodiment 3

FIG. 12 is a left side view illustrating Modification example 2 of a moving vehicle of Embodiment 3. In FIG. 12, elements which are the same as the elements in FIG. 2 will be assigned with the same reference signs.

The moving vehicle 1C of Embodiment 3 illustrated in FIGS. 8 and 9 may use an elevating mechanism illustrated in FIG. 12.

A frame-intersecting-type pantograph mechanism is used as an elevating mechanism 250 in a moving vehicle 1E of Modification example 2 illustrated in FIG. 10.

That is, the elevating mechanism 250 includes a rectangular underframe 251 that is fixed onto the chassis body 11, an outer-side lower frame 252 that is pivotally fitted onto a front end portion of the underframe 251 and is fixed to a first shaft $s_1$ in the right-and-left direction, an inner-side lower frame 253 that is pivotally fitted onto a rear end portion of the underframe 251 and is fixed to a second shaft $s_2$ in the right-and-left direction, am outer-side upper frame 254 that is connected to a tip of the outer-side lower frame 252 via a first hinge unit 256, an inner-side upper frame 255 that is connected to a tip of the inner-side lower frame 253 via a second hinge unit 257, an elevating table 258 that is pivotally fitted to a tip of the outer-side upper frame 254 and a tip of the inner-side upper frame 255, a fixing table 259 that is provided on the elevating table 258, and a telescopic cylinder (not illustrated) that is provided within the underframe 251 and swings the outer-side lower frame 252 or the inner-side lower frame 253 up and down. The imaging unit S1a, which is the first optical sensor S1, is provided on the fixing table 259 via the small-sized rope vibration isolators 62A and the attachment plate 75, which are the second vibration absorbing members 62. The GPS antenna 74 is also provided on the fixing table 259.

According to the elevating mechanism 250 having such a configuration, when the telescopic cylinder is retracted, the frame-intersecting-type pantograph mechanism extends in the vertical direction (arrow H direction) and the imaging unit S1a and the GPS antenna 74 are raised, and when the telescopic cylinder is extended, the frame-intersecting-type pantograph mechanism, retracts and the imaging unit S1a and the GPS antenna 74 are lowered. In this case, since the planar position of the raised imaging unit S1a is adjacent to the midpoint MP of the front wheels 21 and 31 (refer to FIGS. 1A and 1B), the imaging unit S1a rotates with a small rotation radius when the moving vehicle 1D rotates with the midpoint MP as the center. Accordingly, since the shaking of the imaging unit S1a during rotation is mitigated and the shaking is further mitigated by the first and second vibration, absorbing members 61 and 62, image information with less blur can be obtained even during rotation.

OTHER EMBODIMENTS

1. Although a case where the helical vibration isolators (FIG. 4) are adopted as the first vibration absorbing members and the small-sized rope vibration, isolators (FIG. 5) are adopted as the second vibration absorbing members is described in Embodiments 1 and 2, the disclosure is not limited to the wire and rope vibration isolators and a vibration absorbing member may be selected as appropriate according to an environment in which the moving vehicle is used. For example, a case where oil dampers or air dampers are adopted as the first vibration absorbing members and insulators made of rubber, thermoplastic elastomers, or spring are adopted as the second vibration absorbing members is also assumed.

2. Although a case where the second vibration absorbing members are provided between the upper frame unit and the first optical sensor is given as an example in Embodiments 1 and 2, a case where it is sufficient to have only the first vibration absorbing member depending on an environment in which the moving vehicle is used is also assumed. In such a case, the second vibration absorbing members may be omitted and the first optical sensors may be directly attached to the upper frame unit.

3. Although a configuration, in which a driving force is not transmitted to the rear wheels 22 and 32 on the right and left of the electric motor vehicle chassis 10A, is adopted in the case of Embodiment 3 illustrated in FIGS. 8 and 9 and Modification examples 1 and 2 illustrated in FIGS. 10 to 12, a configuration, in which the rotational force of the right front wheel 21 is transmitted to the rear wheel 22 by the right power transmission mechanism 45R and the rotational force of the left front wheel 31 is transmitted to the rear wheel 32 by the left power transmission mechanism 45L, may be adopted as illustrated in FIGS. 7A and 7B.

The disclosed embodiments are examples in all aspects and are not to limit the disclosure. The scope of the disclosure is not the description above but the scope of claims, and includes meaning equivalent to the scope of claims and all modifications within the scope.

The moving vehicle according to the disclosure is applicable to autonomously traveling vehicles, such as a robot for transportation that transports luggage, a robot for monitoring that monitors situations inside a building, near the building, and inside a predetermined site, a search robot that searches for victims in areas hit by disasters, such as earthquakes, tsunamis, and landslides, and an information collecting robot for hazardous regions, such as factories and plants where an accident took place.

The present disclosure contains subject matter related to that disclosed in Japanese Priority Patent Application JP 2017-101932 filed in the Japan Patent Office on May 23, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. A moving vehicle comprising:
a skid-steer electric motor vehicle chassis that is capable of traveling; and
an optical sensor provided on the electric motor vehicle chassis,
wherein the electric motor vehicle chassis includes
a chassis body,
a plurality of wheels that are provided as pairs of right and left wheels at the front and rear of the chassis body, and
a driving unit that individually rotation-drives the pairs of right and left wheels, wherein the optical sensor is disposed, in planar view, at a position nearby an axle line of a pair of right and left wheels on one side of the front and rear, and wherein a pair of right and left wheels on the other side of the front and rear is configured of wheels with rollers each having a wheel body and a plurality of rollers provided on an outer circumferential portion of the wheel body.

2. The moving vehicle according to claim 1, wherein the pair of right and left wheels on the one side of the front and rear each has a wheel body and a tire filled with air that is attached to an outer circumferential portion of the wheel body.

3. The moving vehicle according to claim 1, wherein outer surfaces of the pair of right and left wheels on the one side of the front and rear and outer surfaces of the pair of right and left wheels on the other side of the front and rear are lined up on a same plane.

4. The moving vehicle according to claim 1, wherein the driving unit has two electric motors that individually rotation-drive the pair of right and left wheels on the one side of the front and rear and a battery that supplies electric power to the two electric motors.

5. The moving vehicle according to claim 1, wherein the chassis body has a lower frame unit having the plurality of wheels and the driving unit, an upper frame unit that is provided above the lower frame unit, and a first vibration absorbing member that is provided between the lower frame unit and the upper frame unit and connects the lower frame unit and the upper frame unit together, and wherein the optical sensor is provided on the upper frame unit.

6. The moving vehicle according to claim 2, wherein the chassis body has a lower frame unit having the plurality of wheels and the driving unit, an upper frame unit that is provided above the lower frame unit, and a first vibration absorbing member that is provided between the lower frame unit and the upper frame unit and connects the lower frame unit and the upper frame unit together, and wherein the optical sensor is provided on the upper frame unit.

7. The moving vehicle according to claim 5, further comprising a second vibration absorbing member that is disposed between the upper frame unit and the optical sensor and connects the upper frame unit and the optical sensor together.

8. The moving vehicle according to claim 6, further comprising a second vibration absorbing member that is disposed between the upper frame unit and the optical sensor and connects the upper frame unit and the optical sensor together.

9. The moving vehicle according to claim 5, further comprising:

an elevating mechanism that is provided on the upper frame unit and raises and lowers a first optical sensor; and a second vibration absorbing member that is disposed between the elevating mechanism and the first optical sensor and connects the elevating mechanism and the first optical sensor together.

wherein the optical sensor has the first optical sensor and a second optical sensor, and wherein the second optical sensor is provided on the upper frame unit.

10. The moving vehicle according to claim 6, further comprising:

an elevating mechanism that is provided on the upper frame unit and raises and lowers a first optical sensor; and a second vibration absorbing member that is disposed between the elevating mechanism and the first optical sensor and connects the elevating mechanism and the first optical sensor together, wherein the optical sensor has the first optical sensor and a second optical sensor, and wherein the second optical sensor is provided on the upper frame unit.

11. The moving vehicle according to claim 7, wherein the first vibration absorbing member is a helical vibration isolator having a wire wound around in a spiral, and wherein the second vibration absorbing member is a small-sized rope vibration isolator having a wire wound around in an up-and-down direction, in a right-and-left direction, and in a front-and-rear direction.

12. The moving vehicle according to claim 8, wherein the first vibration absorbing member is a helical vibration isolator having a wire wound around in a spiral, and wherein the second vibration absorbing member is a small-sized rope vibration isolator having a wire wound around in an up-and-down direction, in a right-and-left direction, and in a front-and-rear direction.

13. The moving vehicle according to claim 1, further comprising:

a left power transmission mechanism that is connected to front and rear wheels on the left; and a right power transmission mechanism that is connected to front and rear wheels on the right.

14. The moving vehicle according to claim 7, wherein a distance between axles of front and rear wheels are configured so as to be shorter than a car body width of the electric motor vehicle chassis in a right-and-left direction.

15. The moving vehicle according to claim 1, wherein the optical sensor is disposed, in planar view, between the axle line of the pair of right and left wheels on the one side of the front and rear and an end portion of the electric motor vehicle chassis on a side of the axle line in a front-and-rear direction.

16. The moving vehicle according to claim 4, wherein the driving unit further includes two gear boxes provided between the pair of right and left wheels on the one side of the front and rear and the two electric motors, and wherein the two electric motors are disposed, in planar view, closer to a middle side in a right-and-left direction than the two gear boxes.

* * * * *